US011529282B2

(12) United States Patent
Chen et al.

(10) Patent No.: US 11,529,282 B2
(45) Date of Patent: Dec. 20, 2022

(54) INTERSECTION BLIND-GUIDING SYSTEM, BLIND-GUIDING METHOD AND BLIND-GUIDING TERMINAL

(71) Applicants: BEIJING BOE DISPLAY TECHNOLOGY CO., LTD., Beijing (CN); BOE TECHNOLOGY GROUP CO., LTD., Beijing (CN)

(72) Inventors: Nan Chen, Beijing (CN); Yongzhi Song, Beijing (CN); Dong Wang, Beijing (CN); Tonghua Yang, Beijing (CN); Guohua Zhang, Beijing (CN)

(73) Assignees: BEIJING BOE DISPLAY TECHNOLOGY CO., LTD., Beijing (CN); BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 413 days.

(21) Appl. No.: 16/629,790

(22) PCT Filed: Mar. 11, 2019

(86) PCT No.: PCT/CN2019/077701
§ 371 (c)(1),
(2) Date: Jan. 9, 2020

(87) PCT Pub. No.: WO2019/214338
PCT Pub. Date: Nov. 14, 2019

(65) Prior Publication Data
US 2020/0405567 A1 Dec. 31, 2020

(30) Foreign Application Priority Data
May 8, 2018 (CN) .......................... 201810432898.8

(51) Int. Cl.
A61H 3/06 (2006.01)
G09B 21/00 (2006.01)
G08G 1/005 (2006.01)

(52) U.S. Cl.
CPC ............. *A61H 3/061* (2013.01); *A61H 3/066* (2013.01); *G08G 1/005* (2013.01); *G09B 21/003* (2013.01);
(Continued)

(58) Field of Classification Search
CPC ...... A61H 2201/5064; A61H 2201/165; A61H 2201/1642; A61H 2201/164; A61H 3/066; A61H 3/061; G09B 21/006; G09B 21/003
See application file for complete search history.

(56) References Cited

U.S. PATENT DOCUMENTS

2015/0330787 A1* 11/2015 Cioffi ................. G06Q 30/0261
701/538
2015/0379860 A1* 12/2015 Vardi ................. G08B 21/0275
340/8.1

FOREIGN PATENT DOCUMENTS

CN 1588480 A 3/2005
CN 2925437 Y 7/2007
(Continued)

OTHER PUBLICATIONS

International Search Report and Written Opinion issued in corresponding International Application No. PCT/CN2019/077701, dated May 29, 2019, with English language translation.
(Continued)

Primary Examiner — Robert J Utama
(74) Attorney, Agent, or Firm — McDermott Will & Emery LLP

(57) ABSTRACT

An intersection blind-guiding system includes: a blind-guiding terminal, a plurality of blind road sensors, and a processor configured to be coupled to the blind road sensors. The blind-guiding terminal includes a blind-guiding terminal sensor configured to transmit a sensing signal. The blind road sensors include at least one first blind road sensor and at least one second blind road sensor. The blind road sensors (Continued)

are configured to separately receive the sensing signal transmitted by the blind-guiding terminal sensor, and upload corresponding sensing information. The processor is configured to receive the sensing information uploaded by the blind road sensors, locate a current position of a blind person carrying the blind-guiding terminal, determine a direction in which the blind person previously traveled, determine geographic distribution information of the current position of the blind person, and send a command carrying the geographical distribution information.

18 Claims, 11 Drawing Sheets

(52) U.S. Cl.
CPC ...... *G09B 21/006* (2013.01); *A61H 2003/063* (2013.01); *A61H 2201/165* (2013.01); *A61H 2201/1642* (2013.01); *A61H 2201/5064* (2013.01)

(56) References Cited

FOREIGN PATENT DOCUMENTS

| | | | |
|---|---|---|---|
| CN | 201255927 | Y | 6/2009 |
| CN | 201275241 | Y | 7/2009 |
| CN | 103544836 | A | 1/2014 |
| CN | 104299413 | A | 1/2015 |
| CN | 104306139 | A | 1/2015 |
| CN | 105551237 | A | 5/2016 |
| CN | 106074103 | A | 11/2016 |
| CN | 107753250 | A | 3/2018 |
| CN | 108629966 | A | 10/2018 |
| JP | H10-3594 | A | 1/1998 |
| WO | 2014137016 | A1 | 9/2014 |

OTHER PUBLICATIONS

First Office Action issued in corresponding Chinese Application No. 201810432898.8, dated Nov. 27, 2019, with English language translation.

* cited by examiner

INTERSECTION BLIND-GUIDING SYSTEM, BLIND-GUIDING METHOD AND BLIND-GUIDING TERMINAL

CROSS-REFERENCE TO RELATED APPLICATIONS

This application is a national phase entry under 35 USC 371 of International Patent Application No. PCT/CN2019/077701 filed on Mar. 11, 2019, which claims priority to Chinese Patent Application No. 201810432898.8, filed with the Chinese Patent Office on May 8, 2018, titled "INTERSECTION BLIND-GUIDING SYSTEM, BLIND-GUIDING METHOD AND BLIND-GUIDING TERMINAL", which are incorporated herein by reference in their entirety.

TECHNICAL FIELD

The present disclosure relates to the field of intelligent blind-guiding technologies, and in particular, to an intersection blind-guiding system, a blind-guiding method and a blind-guiding terminal.

BACKGROUND

Humans can obtain most information visually. A blind person has a visual impairment, and the visual impairment greatly limits an ability of the blind person to obtain information. For example, in face of complex road conditions at intersections (including traffic light intersections), it is difficult for the blind to effectively obtain guidance and traffic information, which may easily affect a traffic safety of the blind person.

SUMMARY

In an aspect, some embodiments of the present disclosure provide an intersection blind-guiding system. The intersection blind-guiding system includes a blind-guiding terminal carried by a blind person with him/her, a plurality of blind road sensors configured to be disposed in a corner region on a periphery of an intersection, and a processor configured to be coupled to the plurality of blind road sensors. The blind-guiding terminal includes a blind-guiding terminal sensor, and the blind-guiding terminal sensor is configured to transmit a sensing signal. In the corner region on the periphery of the intersection, the plurality of blind road sensors include at least one first blind road sensor and at least one second blind road sensor. Each first blind road sensor is configured to be disposed in a traveling blind road region at an end of the corner region away from the intersection. Each second blind road sensor is configured to be disposed in a blind road intersection region at an end of the corner region proximate to the intersection. The plurality of blind road sensors are configured to separately receive the sensing signal transmitted by the blind-guiding terminal sensor, and upload corresponding sensing information. The processor is configured to receive the sensing information uploaded by the plurality of blind road sensors, locate a current position of the blind person, determine a direction in which the blind person previously traveled, determine geographic distribution information of the current position of the blind person, and send a command carrying the geographical distribution information.

In some embodiments, the blind-guiding terminal further includes an information transmission component configured to be coupled to the processor. The information transmission component is configured to receive the command carrying the geographical distribution information and transmit the geographic distribution information of the current position of the blind person.

In some embodiments, each second blind road sensor is further configured to be coupled to a traffic light signal controller at the intersection. Each second blind road sensor is further configured to obtain real-time traffic light information at the intersection from the traffic light signal controller in response to receiving the sensing signal, and upload the real-time traffic light information to the processor. The processor is further configured to determine whether traffic light condition in a direction that the blind person is currently facing is suitable for passage according to the direction that the blind person is currently facing and the real-time traffic light information, and send a command carrying the real-time traffic light information and information about whether to be suitable for passage. The information transmission component is further configured to receive the command carrying the real-time traffic light information and the information about whether to be suitable for passage, and transmit the real-time traffic light information in the direction that the blind person is currently facing and the information about whether to be suitable for passage.

In some embodiments, the intersection blind-guiding system further includes at least one first block component configured to be disposed in the corner region on the periphery of the intersection. Each first block component is configured to be disposed in a blind road intersection region at an end of the corner region proximate to the intersection. The processor is further configured to be coupled to the at least one first block component, and the processor is further configured to send a first block command to a first block component corresponding to the current position of the blind person in a case of determining that the traffic light condition in the direction that the blind person is currently facing is unsuitable for passage, and each first block component is configured to receive the first block command and generate an attractive force. The blind-guiding terminal further includes a component to be blocked, and the component to be blocked is configured to be attracted by the attractive force.

In some embodiments, in the corner region on the periphery of the intersection, the plurality of blind road sensors further include at least one third blind road sensor configured to be disposed at a side of the blind road intersection region proximate to the intersection. Each third blind road sensor is configured to be coupled to the traffic light signal controller. Each third blind road sensor is configured to receive the sensing signal transmitted by the blind-guiding terminal sensor and obtain real-time traffic light information at the intersection from the traffic light signal controller, and upload corresponding sensing information and the real-time traffic light information to the processor. The processor is further configured to receive the sensing information and the real-time traffic light information uploaded by the third blind road sensor, locate a position of the blind person when the blind person passes through the third blind road sensor according to the sensing information, determine a traveling direction in which the blind person is about to pass through the intersection, determine whether traffic light condition at the intersection that the blind person is about to pass through is suitable for passage according to the traveling direction and the real-time traffic light information, and send a command carrying the real-time traffic light information and information about whether to be suitable for passage. The information transmission component is further configured to receive the command carrying the real-time traffic light information and the information about whether to be suitable for passage, and transmit the real-time traffic light information at the intersection that the blind person is about to pass through and the information about whether to be suitable for passage.

In some embodiments, the intersection blind-guiding system further includes at least one second block component configured to be disposed in the corner region on the periphery of the intersection. Each second block component is configured to be disposed at a side of a blind road intersection region proximate to the intersection of the corner region. The processor is further configured to be coupled to the at least one second block component, and the processor is further configured to send a second block command to a second block component corresponding to the current position of the blind person in a case of determining that the traffic light condition at the intersection that the blind person is about to pass through is unsuitable for passage, and the second block component is configured to receive the second block command and generate an attractive force. The component to be blocked is further configured to be attracted by the attractive force generated by the second block component.

In some embodiments, each first block component and each second block component includes a magnetic field transmitter, and the component to be blocked includes an electromagnetic coil. The electromagnetic coil is configured to be attracted by the magnetic field transmitter in a case where the magnetic field transmitter generates a magnetic field.

In some embodiments, the at least one first blind road sensor, the at least one second blind road sensor, and the at least one first block component are respectively disposed in reserved spaces below blind bricks in corresponding blind road regions including the traveling blind road region and the blind road intersection region, or disposed inside the blind bricks in the corresponding blind road regions. The at least one third blind road sensor and the at least one second block component are respectively disposed in reserved spaces below blind bricks in corresponding setting regions at a side of the blind road intersection region proximate to the intersection, or disposed inside the blind bricks in the corresponding setting regions, or disposed in reserved space below roads in the corresponding setting regions.

In some embodiments, the plurality of blind road sensors, the at least one first block component, and the at least one second block component are coupled to a power supply of a traffic light at the intersection.

In some embodiments, the blind-guiding terminal further includes a blind-guiding terminal body. The blind-guiding terminal sensor, the information transmission component, and the component to be blocked are disposed on the blind-guiding terminal body. Or, the blind-guiding terminal sensor and the component to be blocked are disposed on the blind-guiding terminal body.

In some embodiments, the blind-guiding terminal further includes a regulator disposed on the blind-guiding terminal body. The regulator is coupled to the component to be blocked, and the regulator is configured to regulate an electrical signal to be provided to the component to be blocked to change a magnitude of the attractive force to which the component to be blocked is subjected.

In some embodiments, the blind-guiding terminal further includes a blind-guiding terminal controller disposed on the blind-guiding terminal body. The blind-guiding terminal controller is coupled to at least one of the blind-guiding terminal sensor, the information transmission component, the component to be blocked, or the regulator.

In some embodiments, the blind-guiding terminal further includes a blind-guiding terminal power supply disposed on the blind-guiding terminal body. The blind-guiding terminal power supply is coupled to the blind-guiding terminal sensor, the information transmission component, the component to be blocked, the regulator, and the blind-guiding terminal controller.

In some embodiments, the blind-guiding terminal body includes a blind-guiding rod or a blind-guiding shoe.

In some embodiments, the blind-guiding terminal sensor includes an integrated circuit chip, and each blind road sensor includes an integrated circuit reader. Or, the blind-guiding terminal sensor includes a radio frequency identification chip, and each blind road sensor includes a radio frequency identification reader. Or, the blind-guiding terminal sensor includes an electromagnetic coil, and each blind road sensor includes an electromagnetic sensor.

In some embodiments, the information transmission component includes a voice broadcaster.

In another aspect, some embodiments of the present disclosure provide an intersection blind-guiding method. The intersection blind-guiding method includes: obtaining sensing information uploaded by at least one first blind road sensor in a traveling blind road region and at least one second blind road sensor in a blind road intersection region respectively in cases where a blind person carrying a blind-guiding terminal passes through the traveling blind road region at an end of a corner region on a periphery of an intersection away from the intersection, and the blind road intersection region at an end of the corner region proximate to the intersection; locating a current position of the blind person, and determining a direction in which the blind person previously traveled according to the sensing information; and determining geographic distribution information of the current position of the blind person according to the direction in which the blind person previously traveled, and sending a command carrying the geographical distribution information to an information transmission component.

In some embodiments, the intersection blind-guiding method further includes: obtaining real-time traffic light information at the intersection; and determining whether traffic light condition in a direction that the blind person is currently facing is suitable for passage according to the direction that the blind person is currently facing and the real-time traffic light information; and sending a command carrying the real-time traffic light information and information about whether to be suitable for passage to the information transmission component.

In some embodiments, the intersection blind-guiding method further includes: sending a first block command to a first block component corresponding to the current position of the blind person in a case of determining that the traffic light condition in the direction that the blind person is currently facing is unsuitable for passage.

In some embodiments, the intersection blind-guiding method further includes: obtaining sensing information uploaded by at least one third blind road sensor corresponding to the current position of the blind person, and obtaining the real-time traffic light information from a traffic light signal controller at the intersection through the at least one third blind road sensor when the blind person passes through a region at a side of the blind road intersection region proximate to the intersection; locating the current position of the blind person, and determining a traveling direction in which the blind person is about to pass through the intersection according to the sensing information; and determining whether traffic light condition at the intersection that the blind person is about to pass through is suitable for passage according to the traveling direction and the real-time traffic light information, and sending a command carrying the real-time traffic light information and information about whether to be suitable for passage.

In some embodiments, determining whether the traffic light condition is suitable for passage, includes: determining whether a traffic light is a green light currently and whether remaining time of the green light is greater than a set threshold value, if so, determining that the traffic light condition is suitable for passage, and if not, determining that the traffic light condition is unsuitable for passage.

In some embodiments, the intersection blind-guiding method further includes: sending a second block command to a second block component corresponding to the current position of the blind person in a case of determining that the traffic light condition at the intersection that the blind person is about to pass through is unsuitable for passage.

In some embodiments, the intersection blind-guiding method further includes: during an execution of the first block command by the first block component corresponding to the current position of the blind person, determining whether to be suitable for passage currently according to real-time traffic light information in the direction that the blind person is currently facing, and if so, sending a block release command to the first block component corresponding to the current position of the blind person; and/or, during an execution of the second block command by the second block component corresponding to the current position of the blind person, determining whether to be suitable for passage currently according to the real-time traffic light information at the intersection that the blind person is about to pass through, and if so, sending a block release command to the second block component corresponding to the current position of the blind person.

In some embodiments, the intersection blind-guiding method further includes: sending a passage command to the first block component corresponding to the current position of the blind person in a case of determining that the traffic light condition in the direction that the blind person is currently facing is suitable for passage; and/or, sending a passage command to the second block component corresponding to the current position of the blind person in a case of determining that the traffic light condition at the intersection that the blind person is about to pass through is suitable for passage.

In yet another aspect, some embodiments of the present disclosure provide a blind-guiding terminal. The blind-guiding terminal includes a blind-guiding terminal body, a blind-guiding terminal sensor disposed on the blind-guiding terminal body and an information transmission component. The blind-guiding terminal sensor is configured to transmit a sensing signal. The information transmission component is configured to transmit at least one of geographic distribution information corresponding to a current position of a blind person carrying the blind-guiding terminal, real-time traffic light information at an intersection, or information about whether to be suitable for passage.

In yet another aspect, some embodiments of the present disclosure provide a computer product. The computer product includes one or more processors, and the one or more processors are configured to execute computer instructions to perform one or more steps of the intersection blind-guiding method described above.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art may obtain other drawings according to these drawings without paying any creative effort.

DETAILED DESCRIPTION

The technical solutions in some embodiments of the present disclosure will be described clearly and completely with reference to the accompanying drawings in some embodiments of the present disclosure. Obviously, the described embodiments are merely some but not all of embodiments of the present disclosure. All other embodiments made on the basis of some embodiments of the present disclosure by a person of ordinary skill in the art without paying any creative effort shall be included in the protection scope of the present disclosure.

In some embodiments of the present disclosure, the term "a plurality of" means two or more unless otherwise specified. The term "and/or" is merely used to describe an association relationship of associated objects, which represents three kinds of relationships. For example, "A and/or B" represents three conditions: A exists alone, A and B exist simultaneously, and B exists alone. Terms "first" and "second" are used to distinguish between same or similar items whose functions and effects are substantially the same. A person skilled in the art will understand that the terms "first" and "second" are not intended to limit quantity and order of execution of the items, and do not limit a difference.

In the related art, navigation and positioning functions of a global positioning system (GPS) are usually used to assist a blind person to obtain guidance information at an intersection. However, an identification accuracy of a civil GPS is on average 10 m to 15 m, and the identification accuracy is very low, which is not conducive to guide the blind person. For example, at an intersection with complex road condition, it is difficult for the GPS to accurately identify whether the blind person is at a sidewalk proximate to the intersection or at a center of the intersection. That is to say, it is difficult for the GPS to accurately locate the blind person at the intersection, and thus it is difficult to ensure that the blind person safely passes through the intersection.

Figure 1:
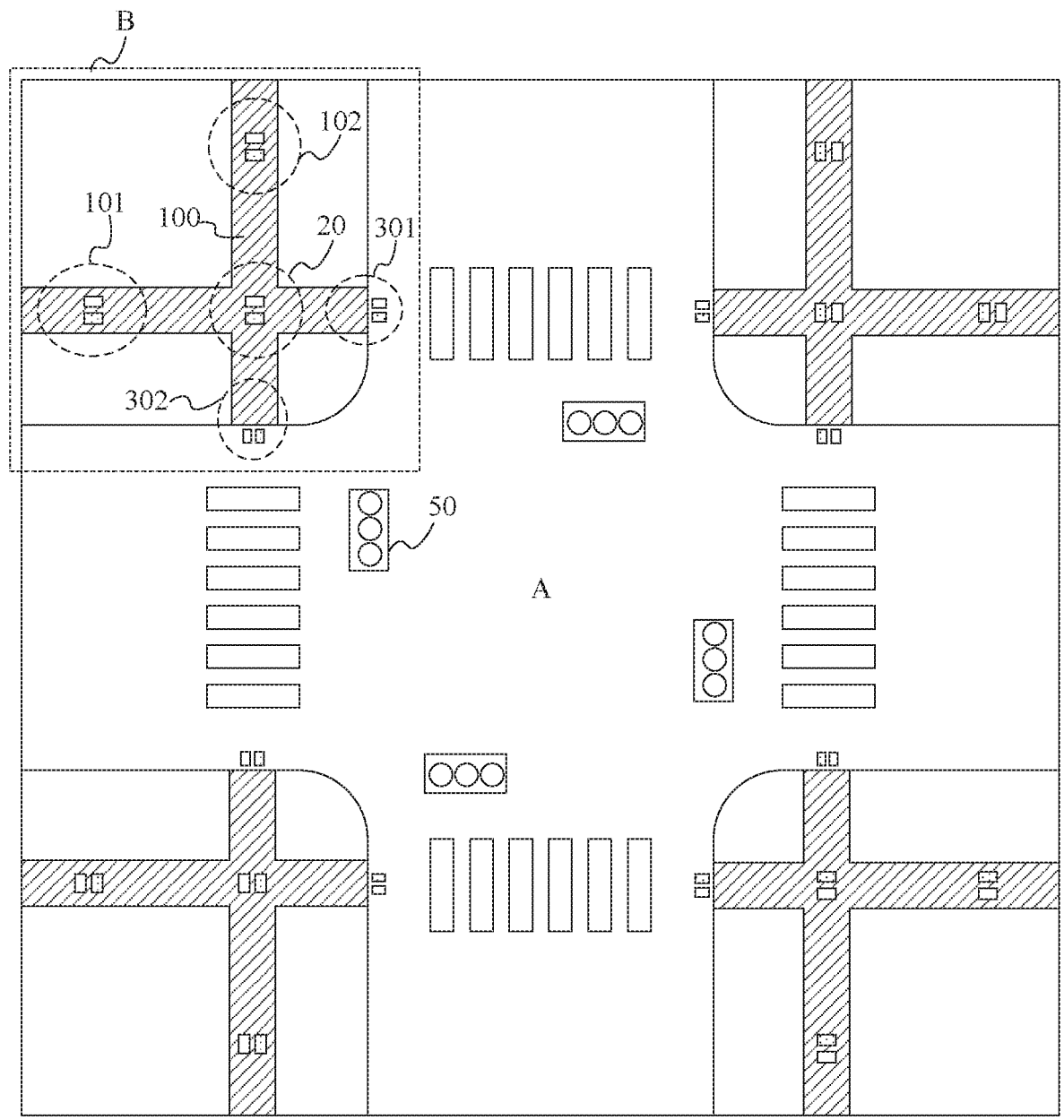
FIG. 1 is a schematic diagram showing a scene of an intersection, according to some embodiments of the present disclosure.
Figure 2:
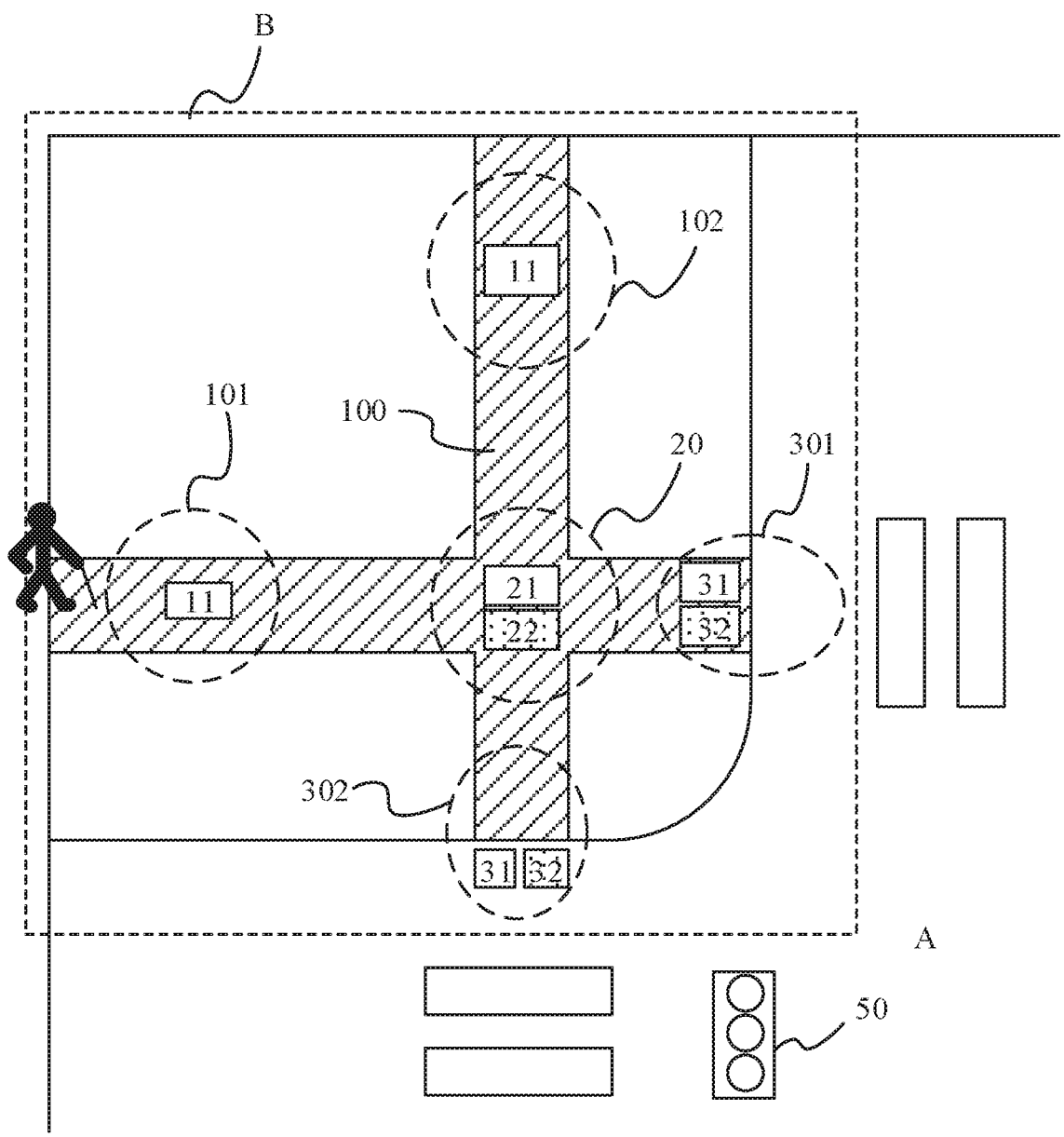
FIG. 2 is a schematic diagram showing a scene of a corner region around the intersection, according to some embodiments of the present disclosure.

Referring to FIGS. 1 and 2, some embodiments of the present disclosure provide an intersection blind-guiding system. The intersection blind-guiding system is configured to provide guidance information to a blind person at an intersection A. The intersection A is an intersection where two or more roads intersect. A traffic light 50 configured to direct vehicles and pedestrians is usually provided at the intersection A. There are a plurality of corner regions B around the intersection A. For example, in a case where the intersection A is a crossroad, there are four corner regions B around the intersection A, and each adjacent two corner regions B are opposite and connected with each other through a sidewalk.

At least two blind roads 100 for assisting the blind person to walk are provided in each corner region B. Different blind roads extend along different directions. Portions of the at least two blind roads 100 located at a distal intersection end of the corner region B (an end of the corner region B away from the intersection A) are traveling blind road regions. Each traveling blind road region is provided with strip-shaped guide bricks to guide the blind person to safely walk. Different blind roads 100 intersect at an end of the corner region B proximate to the intersection A to form a blind road intersection region, which is also referred to as a prompt blind road region. The blind road intersection region is provided with prompt bricks having dots to remind the blind person that there are obstacles such as the intersection A in front.

Figure 3:
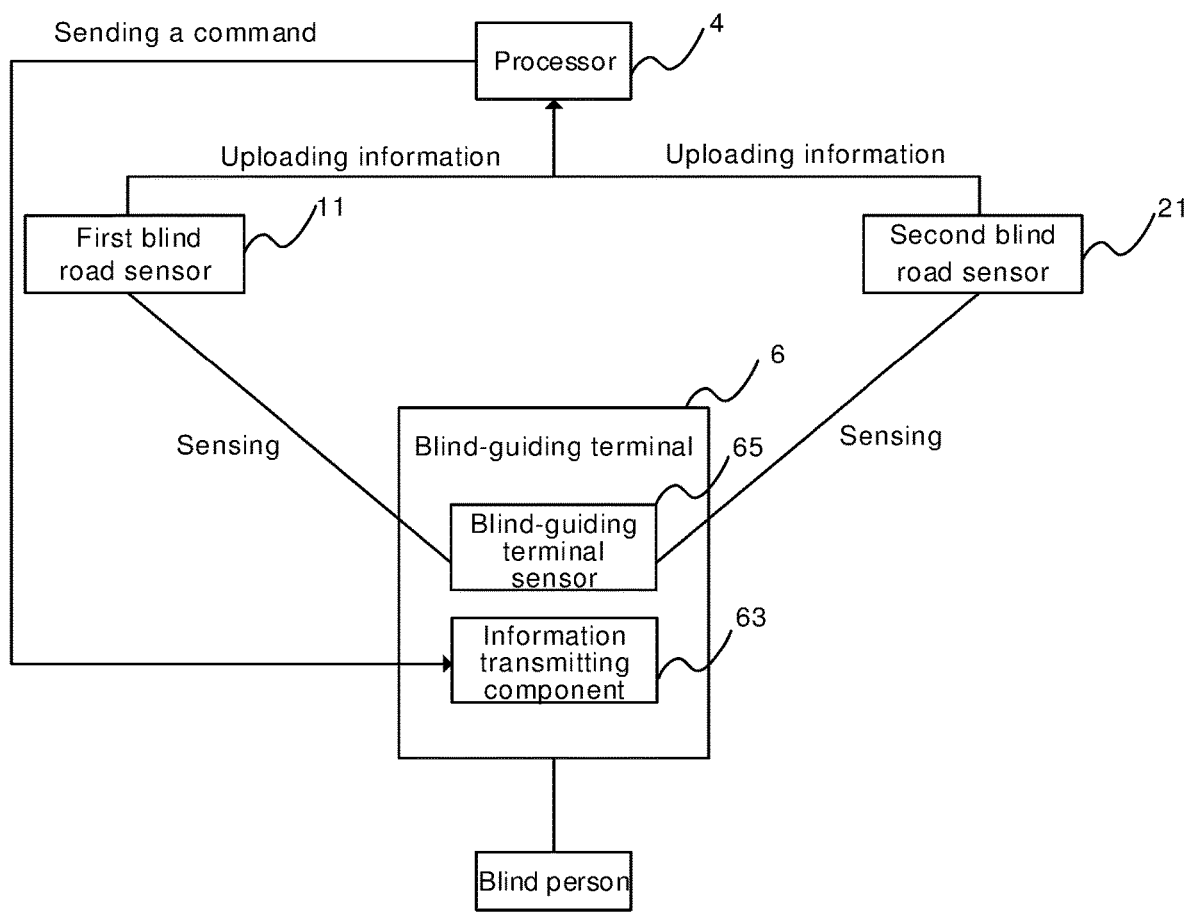
FIG. 3 is a schematic diagram showing a structure of an intersection blind-guiding system, according to some embodiments of the present disclosure.

Referring to FIG. 3, the intersection blind-guiding system provided by some embodiments of the present disclosure includes a blind-guiding terminal 6, a plurality of blind road sensors disposed in each corner region B on a periphery of the intersection A, and a processor 4.

The blind-guiding terminal 6 is carried by the blind person with him/her. The blind-guiding terminal 6 includes a blind-guiding terminal sensor 65 configured to transmit a sensing signal.

In each corner region B at the intersection A, the plurality of blind road sensors include at least one first blind road sensor 11 and at least one second blind road sensor 21. Each first blind road sensor 11 is disposed in a corresponding one of the traveling blind road regions at an end of the corner region B away from the intersection A (referring to the positions 101 or 102 in FIG. 1 or 2). Each second blind road sensor 21 is disposed in the blind road intersection region at an end of the corner region B proximate to the intersection (referring to the position 20 in FIG. 1 or 2). The plurality of blind road sensors are configured to, when the blind person carrying the blind-guiding terminal 6 passes through respective positions where the blind road sensors are located, separately receive a sensing signal transmitted by the blind-guiding terminal sensor 65 and upload corresponding sensing information.

Here, the traveling blind road region at the end of the corner region B away from the intersection A is, for example, a blind road region that is 5 m or 10 m from the blind road intersection region in a direction in which the corner region B is away from the intersection A. Some embodiments of the present disclosure do not limit a distance between the traveling blind road region and the blind road intersection region.

The processor 4 is coupled to the plurality of blind road sensors, and the processor 4 is configured to receive the sensing information transmitted by the plurality of blind road sensors, locate a current position of the blind person, determine a direction in which the blind person previously traveled and a direction that the blind person is currently facing, determine geographic distribution information of the current position of the blind person and send a command carrying the geographical distribution information.

It will be noted that, in some embodiments of the present disclosure, the direction that the blind person is currently facing refers to a direction that the blind person is facing in a case where the blind person moves from a first position to a second position and stands at the second position without turning around. For example, if the blind person moves from the position 101 to the position 20 in FIG. 2, and a direction from the position 101 to the position 20 is the east, it is determined that the direction that the blind person is currently facing is the east.

The blind-guiding terminal 6 is carried by the blind person with him/her, and the blind-guiding terminal 6 further includes an information transmission component 63 coupled to the processor 4, The information transmission component 63 is configured to receive the command carrying the geographical distribution information and send the geographic distribution information of the current position of the blind person to the blind person. In this way, after the processor 4 sends the command carrying the geographical distribution information, the blind-guiding terminal 6 may timely send the geographical distribution information of the current position of the blind person to the blind person, thereby facilitating the blind person to understand his/her environment.

It will be added that, the geographic distribution information transmitted by the information transmission component 63 is information that may assist the blind person in estimating the blind person's environment, such as a name of a geographical position of the blind person, or names of places to which the blind person may travel in front, rear, left and right directions, or names of landmark buildings on all sides of the blind person, and the like. Based on actual requirements of the blind person, one kind of information may be individually transmitted, or a combination of any two or several kinds of information may be transmitted.

For example, referring to FIGS. 2 and 3, in each corner region B on a periphery of the intersection A, the traveling blind road region at the end of the corner region B away from the intersection (taking the position 101 in FIG. 2 as an example) is provided with a first blind road sensor 11. The blind road intersection region at the end of the corner region B proximate to the intersection (taking the position 20 in FIG. 2 as an example) is provided with a second blind road sensor 21. When the blind person carrying the blind-guiding terminal 6 passes through the position 101, the blind-guiding terminal sensor 65 of the blind-guiding terminal 6 is identified by the first blind road sensor 11 located at the position 101, the first blind road sensor 11 receives a sensing signal transmitted by the blind-guiding terminal sensor 65, and uploads sensing information to the processor 4. The processor 4 receives the sensing information uploaded by the first blind road sensor 11 at the position 101 to locate the position 101 that the blind person passes through during a traveling process. The blind person continues to move on, the blind-guiding terminal sensor 65 of the blind-guiding terminal 6 is identified by the second blind road sensor 21 located at the position 20. The second blind road sensor 21 receives the sensing signal transmitted by the blind-guiding terminal sensor 65, and uploads sensing information to the processor 4. The processor 4 receives the sensing information uploaded by the second blind road sensor 21 at the position 20 to locate the position 20 that the blind person passes through during the traveling process. According to location information of the position 101 and the position 20, the processor 4 determines that the direction in which the blind person previously traveled is from the position 101 to the position 20, and determines the direction that the blind person is facing when the blind person walks to the position 20, and further determines the geographic distribution information of the current position of the blind person. The processor 4 sends a command carrying the geographical distribution information to the information transmission component 63 of the blind-guiding terminal 6. Then the blind person may know the geographical distribution information of the current position, so that the blind person may timely and accurately distinguish the direction to find a correct route.

In some embodiments of the present disclosure, the blind person carrying the blind-guiding terminal 6 passes through a traveling blind road region at the end of a corner region B away from the intersection A, and the blind road intersection region at the end of the corner region B proximate to the intersection. The blind-guiding terminal sensor 65 of the blind-guiding terminal 6 carried by the blind person transmits the sensing signal, so that the first blind road sensor 11 and the second blind road sensor 21 disposed at the two positions separately receive the sensing signal and identify the blind-guiding terminal 6, As a result, the blind person may be distinguished from an ordinary pedestrian through the blind-guiding terminal 6, Moreover, the first blind road sensor 11 and the second blind road sensor 21 are disposed at different positions in the corner region B on a periphery of the intersection A, and the first blind road sensor 11 and the second blind road sensor 21 upload the sensing information to the processor 4, thereby achieving a field sensing of the intersection blind-guiding system to the blind person. That is, an identification range of position information of the blind person may be narrowed down to a travel route of the blind person in the corner region B, thereby improving an identification accuracy of the position of the blind person.

Based on this, after processing and comprehensively determining the sensing information by the processor 4, the direction in which the blind person previously traveled and the direction that the blind person is currently facing may be accurately determined, and the geographic distribution information of the current position of the blind person is determined, thereby ensuring an accuracy of a field location of the blind person, and timeliness and an accuracy of a guidance information reminder. Thus, a strong guarantee for the blind person to safely pass through the intersection may be provided.

It will be noted that, in some embodiments of the present disclosure, a type of the blind-guiding terminal sensor 65 corresponds to a type of the blind road sensor, and a signal communication manner is determined according to a manner suitable for the type of the blind-guiding terminal sensor 65 and the type of the blind road sensor. For example, the blind-guiding terminal sensor 65 is an integrated circuit (IC) chip, the blind road sensor is an IC chip reader, and both identify each other by using an electromagnetic signal with a certain frequency. Or, the blind-guiding terminal sensor 65 is an radio frequency identification (RFC) chip, the blind road sensor is a RFID reader, and both identify each other by using a radio frequency signal. Or, the blind-guiding terminal sensor 65 is an electromagnetic coil, the blind road sensor is an electromagnetic sensor, and both identify each other by using an electromagnetic signal.

Here, the at least one first blind road sensor 11 and the at least one second blind road sensor 21 are disposed, for example, in reserved spaces below blind bricks in corresponding blind road regions. Or, they are disposed inside the blind bricks in the corresponding blind road regions, and are integrated with the blind bricks.

Here, the processor 4 is a controller or a processing element or a combination of a plurality of processing elements. The processor 4 includes at least one of or any combination of at least two of a cloud server, a central processing unit (CPU), a general purpose processor, a digital signal processor (DSP), an application-specific integrated circuit (ASIC), a field programmable gate array (FPGA), or a transistor logic device.

Here, the information transmission component 63 includes a voice broadcaster, such as a loudspeaker, a power amplifier, a speaker, earphone(s) or other voice broadcast devices.

Figure 4:
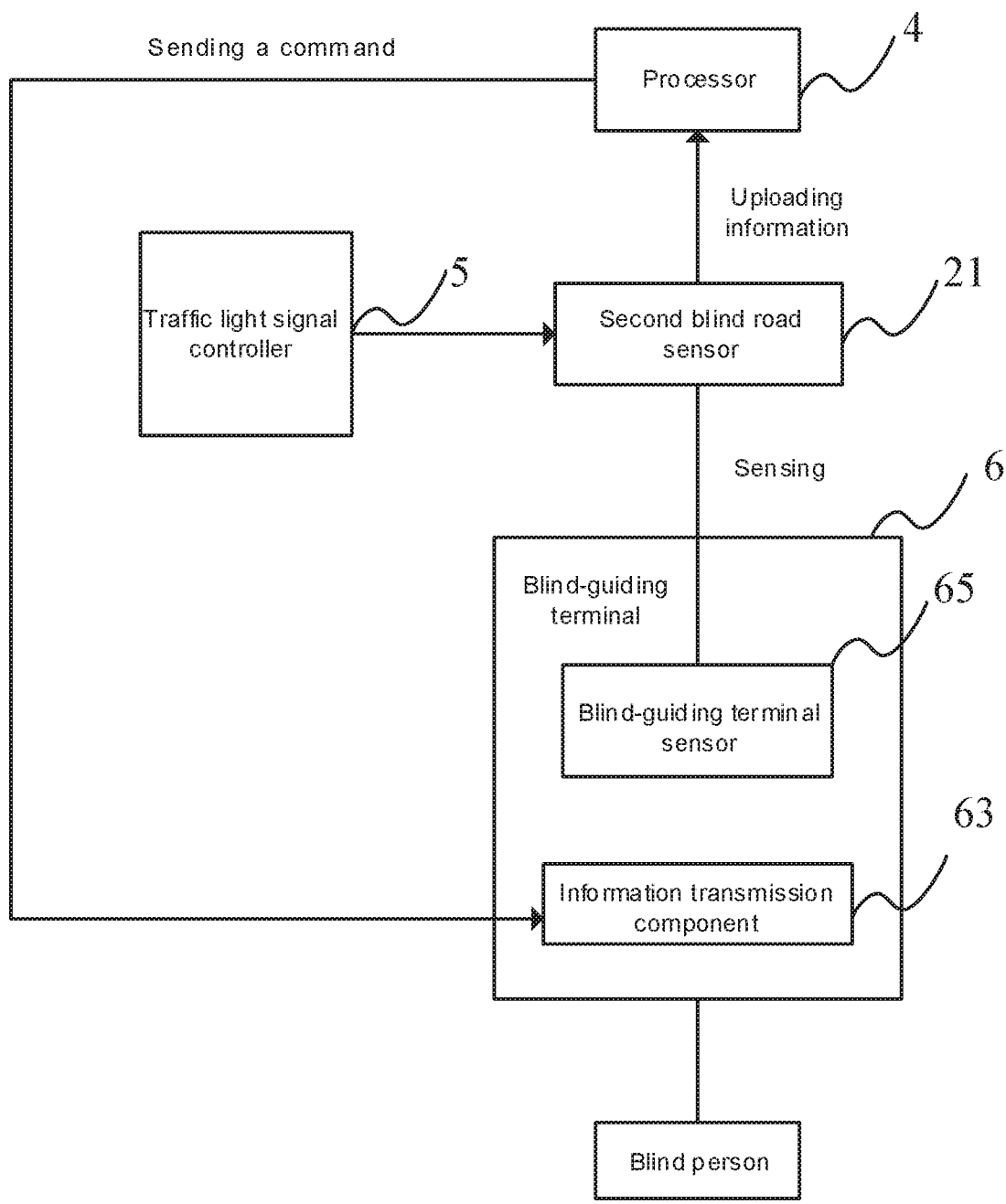
FIG. 4 is a schematic diagram showing another structure of an intersection blind-guiding system, according to some embodiments of the present disclosure.

Referring to FIG. 4, in some embodiments, each second blind road sensor 21 is further coupled to a traffic light signal controller 5 at the intersection. Each second blind road sensor 21 is further configured to obtain real-time traffic light information at the intersection from the traffic light signal controller 5 in a case of receiving the sensing signal transmitted by the blind-guiding terminal sensor 65, and upload the real-time traffic light information to the processor 4.

The processor 4 is further configured to determine whether traffic light condition in the direction that the blind person is currently facing is suitable for the passage of the blind person according to the direction that the blind person is currently facing and the real-time traffic light information, and send a command carrying the real-time traffic light information and information about whether to be suitable for the passage.

The information transmission component 63 is further configured to receive the command carrying the real-time traffic light information and the information about whether to be suitable for the passage, and transmit the real-time traffic light information in the direction that the blind person is currently facing and the information about whether to be suitable for the passage to the blind person. Therefore, when the blind person is in a region where the blind roads extending in different directions intersect with in a same corner region on a periphery of the intersection, the blind person may also obtain the real-time traffic light information in the direction that the blind person is currently facing and the information about whether to be suitable for the passage.

For example, referring to FIG. 2, when the blind person walks to the position 20, the second blind sensor 21 obtains the real-time information of the traffic light at the intersection from the traffic light signal controller 5, and the traffic light is a red light at this moment. The second blind sensor 21 uploads information that the traffic light is the red light to the processor 4. The processor 4 sends a command representing that the traffic light is the red light and it is unsuitable to travel currently to the information transmission component 63, according to the direction that the blind person is currently facing and the information that the traffic light is the red light currently. The information transmission component 63 broadcasts the command to the blind person, and the blind person may know the traffic light condition in the direction that the blind person is currently facing and whether to be suitable for the passage. For another example, when the blind person walks to the position 20, a traffic light is a green light. After the above information transmission process, the processor 4 determines that the traffic light condition in the direction that the blind person is currently facing is suitable for the passage, and the information transmission component 63 will broadcast information that it is suitable to travel currently to the blind person.

In some embodiments of the present disclosure, an accurate geographical position information guidance for the blind person at the intersection may be achieved, and the traffic light information and the information about whether to be suitable for the passage may be transmitted to the blind person through the information transmission component. In this way, the blind person who is about to pass through the intersection may be provided richer reference information about real-time condition at the intersection.

Figure 5:
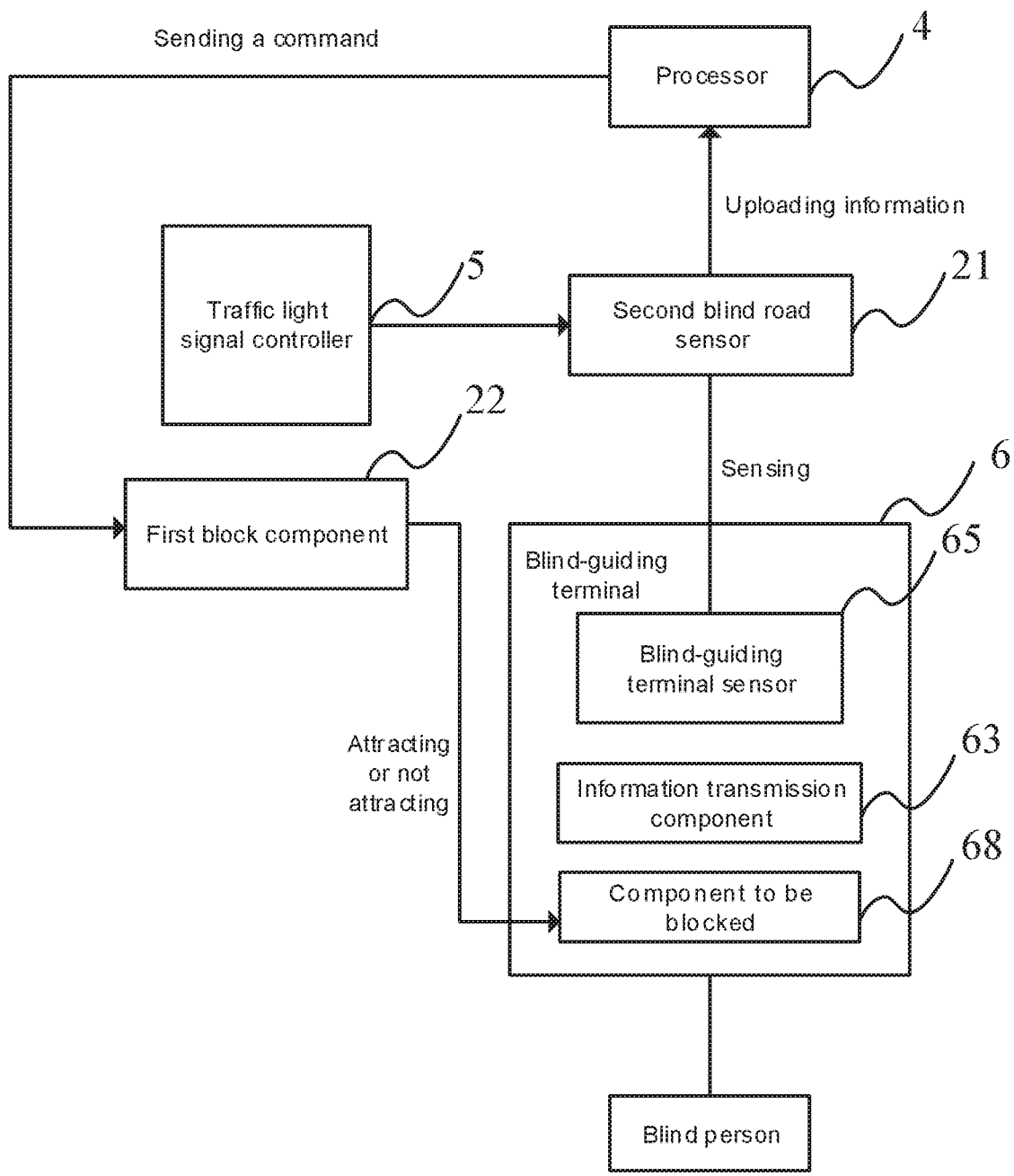
FIG. 5 is a schematic diagram showing yet another structure of an intersection blind-guiding system, according to some embodiments of the present disclosure.

Referring to FIGS. 2 and 5, in some embodiments of the present disclosure, the intersection blind-guiding system further includes at least one first block component 22 disposed in the corner region B on a periphery of the intersection A. Each first block component 22 is disposed in the blind road intersection region at the end of the corner region proximate to the intersection.

The processor 4 is further coupled to the at least one first block component 22. The processor 4 is further configured to send a first block command to a first block component corresponding to the current position of the blind person in a case of determining that the traffic light condition in the direction that the blind person is currently facing is unsuitable for the passage, and the first block component 22 is configured to receive the first block command and generate an attractive force.

It will be understood that, the first block component 22 and the second blind road sensor 21 are disposed in a same region in a same corner region B, and positions of both are proximate to each other. After the second blind road sensor 21 receives the sensing signal, the processor 4 may quickly determine whether the traffic light condition in the direction that the blind person is currently facing is suitable for the passage. Since time required for a signal transmission and a determination performed by the processor 4 is very short, after that, the blind person is still located in a vicinity of the position where the second blind sensor 21 is disposed. The first block component 22 is disposed proximate to the second blind road sensor 21, and thus may timely block the blind person.

Here, the first block component 22 is disposed, for example, in a reserved space below a blind brick in a corresponding blind road region, or disposed inside the blind brick in the corresponding blind road region.

The blind-guiding terminal 6 further includes a component to be blocked 68. The component to be blocked 68 is configured to, in a case where the first block component 22 corresponding to the current position of the blind person generates an attractive force, be attracted by the attractive force. Therefore, when the blind person is in the blind road intersection region at the end of the corner region proximate to intersection, the blind person may be reminded of traffic light signal condition by means of a tactile reminder.

For example, referring to FIGS. 2 and 5, when the blind person is at the position 20, and the traffic light signal is the red light, the processor 4 determines that the traffic light condition is unsuitable for the passage, and sends a first block command to a first block component 22 disposed at the position 20. After receiving the first block command, the first block component 22 generates an attractive force to attract the component to be blocked 68, thereby enabling the blind person to feel the attractive force through the blind-guiding terminal 6 carried, and achieving the tactile reminder for the blind person to obtain the traffic light information.

Reminding the blind person of the traffic light condition by means of the tactile reminder may avoid a situation that a voice prompt information is affected due to a noisy environment, and increase ways for the blind person to obtain the traffic light information in the direction that the blind person is facing.

It will be understood here that, when the blind person is reminded of the traffic light information, the blind person is, for example, reminded by means of a voice broadcast or the tactile reminder, or both of the voice broadcast and the tactile reminder.

Figure 6:
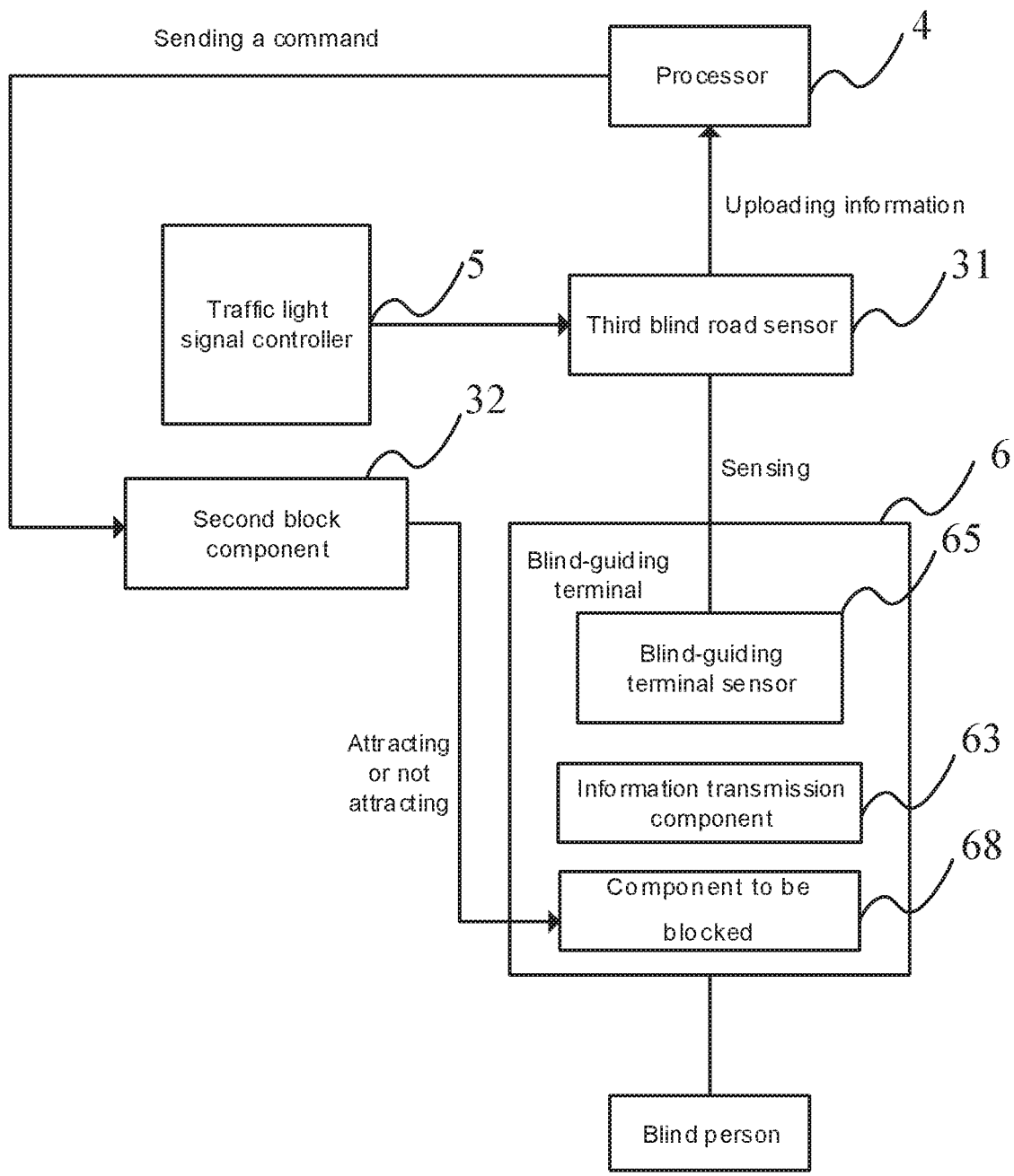
FIG. 6 is a schematic diagram showing yet another structure of an intersection blind-guiding system, according to some embodiments of the present disclosure.

Referring to FIG. 6, in some embodiments of the disclosure, in each corner region B on a periphery of the intersection A, the plurality of blind road sensors further include at least one third blind road sensor 31 disposed at a side of the blind road intersection region proximate to the intersection (referring to the position 301 or the position 302 in FIG. 2). Each third blind road sensor 31 is coupled to the traffic signal controller 5 at the intersection. Each third blind road sensor 31 is configured to, in a case where the blind person passes through a position of the third blind road sensor 31, receive the sensing signal transmitted by the blind-guiding terminal sensor 65, obtain real-time traffic light information at the intersection from the traffic light signal controller 5, and upload corresponding sensing information and the real-time traffic light information to the processor 4.

The processor 4 is further configured to receive the sensing information and the real-time traffic light information uploaded by the third blind road sensor 31, locate the position of the blind person when the blind person passes through a corresponding third blind road sensor 31 according to the sensing information, determine a traveling direction in which the blind person is about to pass through the intersection, determine whether the traffic light condition at the intersection that the blind person is about to pass through is suitable for the passage according to the traveling direction and the real-time traffic light information, and send a command carrying the real-time traffic light information and information about whether to be suitable for the passage.

The information transmission component 63 is further configured to receive the command carrying the real-time traffic light information and the information about whether to be suitable for the passage, and transmit the real-time traffic light information at the intersection that the blind person is about to pass through and the information about whether to be suitable for the passage to the blind person.

For example, referring to FIGS. 2 and 6, the blind person selects a traveling direction according to the information transmitted by the information transmission component 63 at the position 20, and continues to travel to the position 301. When the blind person passes through the position 301, the traffic light signal is the red light, and a third blind road sensor 31 uploads the obtained sensing signal and the obtained real-time traffic light information at the intersection A to the processor 4. The processor 4 locates the position 301 of the blind person according to the sensing information uploaded by the third blind road sensor 31, and determines that the blind person is about to pass through the intersection A through the position 301. In addition, the processor 4 determines that it is unsuitable for the blind person to travel currently, and sends a command carrying the real-time traffic light information and information representing that it is unsuitable to travel to the information transmission component 63. After the blind person receives the information transmitted by the information transmission component 63, the blind person may know that it is unsuitable to travel currently.

Here, the information transmission component 63 is used to transmit the real-time traffic light information at the intersection A that the blind person is about to pass through and the information about whether to be suitable for the passage to the blind person by means of, for example, the voice broadcast. In addition, it is also permissible to transmit the information about whether the intersection A that the blind person is about to pass through is suitable for the passage to the blind person by means of the tactile reminder.

Optionally, referring to FIGS. 2 and 6, the intersection blind-guiding system further includes at least one second block component 32 disposed in the corner region B on a periphery of the intersection. Each second block component 32 is disposed at a side of the blind road intersection region of the corner region B proximate to the intersection. The processor 4 is further coupled to the at least one second block component 32. The processor 4 is further configured to send a second block command to a second block component 32 corresponding to the current position of the blind person in a case where the traffic light condition at the intersection that the blind person is about to pass through is unsuitable for the passage, and the second block component 32 is configured to receive the second block command and generate an attractive force to attract the component to be blocked 68.

For example, referring to FIGS. 2 and 6, the blind person selects the traveling direction according to the information transmitted by the information transmission component 63 at the position 20, and continues to travel to the position 301. When the blind person passes through the position 301, the traffic light signal is the red light, and a third blind road sensor 31 uploads the obtained sensing signal and the obtained real-time traffic light information at the intersection A to the processor 4, The processor 4 locates the position 301 of the blind person according to the sensing information uploaded by the third blind road sensor 31, and determines that the blind person is about to pass through the intersection A through the position 301. In addition, the processor 4 determines that it is unsuitable for the blind person to travel currently, and sends a second block command to the second block component 32 at the position 301 corresponding to the current position of the blind person. The second block component 32 generates an attractive force after receiving the second block command to attract the component to be blocked 68, thereby enabling the blind person to obtain tactile reminder information about the traffic light signal at the current position 301.

It will be understood here that, when the blind person is reminded of the traffic light information, the blind person may be reminded by means of the voice broadcast performed by the information transmission component 63 or the tactile reminder performed by the second block component 32, or both of the voice broadcast and the tactile reminder.

Since a travel speed of the blind person is generally slow, a traffic light signal may change when the blind person reaches the position 301 from the position 20, Or, since the blind person may change the travel direction after the blind person passes through the position 20, for example, when the blind person turns from the position 20 to the position 302, the traffic light condition previously received by the blind person at the position 20 does not meet requirements of a current travel direction of the blind person. In this case, the third blind sensor 31 and/or the second block component 32 are disposed at the side of the blind road intersection region proximate to the intersection A (referring to the position 301 or the position 302 in FIG. 2), and the blind person is reminded of the traffic light condition at the intersection A that the blind person is about to pass through by means of the voice broadcast or the tactile reminder. Therefore, it may effectively ensure timeliness of the traffic light information received by the blind person before the blind person passes through the intersection A, achieve a secondary traffic light information reminder before the blind person passes through the intersection A, and avoid a safety problem due to a change of the traffic light signal before the blind person passes through the intersection.

It will be understood here that, the second block component 32 and the third blind road sensor 31 are disposed in a same region in a same corner region B, and positions of both are proximate to each other, so that the processor 4 may control the second block component 32 to block the blind person in time after locating the blind person according to the sensing signal received by the third blind road sensor 31.

It will be noted that, some embodiments of the present disclosure do not limit the positions of the third blind road sensor 31 and the second block component 32. Specific positions of the third blind road sensor 31 and the second block component 32 may be selected according to actual conditions of the intersection A and the corner regions B around the intersection A, as long as the positions are positions that are located at the side of the blind road intersection region proximate to the intersection A and where vehicles and pedestrians may be effectively avoided.

For example, the third blind road sensor 31 and the second block component 32 are disposed at a region of the road proximate to a sidewalk (referring to the position 302 in FIG. 2). This position is relatively safe, and avoids collisions between the pedestrians and the blind person and between the vehicles and the blind person. Correspondingly, the third blind road sensor 31 and the second block component 32 are disposed in a reserved space below the road in the setting regions.

For another example, some junctions of the sidewalks and the intersection are provided with barrier pillars that block the vehicles, and the sidewalks are relatively safe. The third blind road sensor 31 and the second block component 32 are disposed at a position at a boundary of the sidewalk proximate to the intersection (referring to the position 301 in FIG. 2). Correspondingly, the third blind road sensor 31 and the second block component 32 are disposed in reserved spaces below blind bricks in corresponding setting regions, or disposed inside the blind bricks in the corresponding setting regions, and are integrated with the blind bricks.

Some embodiments of the present disclosure do not limit types of the first block component 22 and the second block component 32, as long as the tactile reminder to the blind person may be achieved in a case where it is unsuitable to travel. The first block component 22 and the second block component 32 are, for example, magnetic field transmitters. The component to be blocked 68 is, for example, an electromagnetic coil, and the electromagnetic coil is configured to be attracted by the magnetic field transmitter when the magnetic field transmitter generates a magnetic field. For example, at the position 301, after the second block component 32 receives the second block command, the electromagnetic coil in the magnetic field transmitter as the second block component 32 operates to continuously emit an electromagnetic field. The blind person carrying the blind-guiding terminal 6 is at the position 301, and the electromagnetic coil in the blind-guiding terminal 6 is in an energized state, Under actions of the magnetic field generated by the magnetic field transmitter, the electromagnetic coil in the blind-guiding terminal 6 is attracted by the magnetic field transmitter, so that the blind person perceives that the blind-guiding terminal 6 is attracted by an external attractive force, and then the blind person knows that it is unsuitable to travel at this time.

In the intersection blind-guiding system in some embodiments of the present disclosure, a power supply may be independently configured to supply power to the plurality of blind road sensors, the at least one first block component 22 and the at least one second block component 32, or an existing power supply device at the intersection A may be used to supply power to the plurality of blind road sensors, the at least one first block component 22 and the at least one second block component 32. Optionally, the plurality of blind road sensors, the at least one first block component 22 and the at least one second block component 32 are coupled to a power supply of the traffic light 50 at the intersection, respectively. The plurality of blind road sensors, the at least one first block component 22, the at least one second block component 32 and the power supply of the traffic light 50 are all located at the intersection A and surrounding regions, and thus coupling distances are short, and a wiring is simple and convenient.

In the intersection blind-guiding system in some embodiments of the present disclosure, there are a plurality of structures of the blind-guiding terminal 6. Optionally, the blind-guiding terminal 6 further includes a blind-guiding terminal body. The blind-guiding terminal sensor 65 and the component to be blocked 68 are disposed on the blind-guiding terminal body. In addition, the information transmission component 63 is disposed on the blind-guiding terminal body (for example, the information transmission component 63 is a speaker disposed on the blind-guiding terminal body), or the information transmission component 63 is independently disposed (for example, the information transmission component 63 is a bluetooth headset worn by the blind person).

Different blind persons feel different about a magnitude of a force of the tactile reminder. In some embodiments of the present disclosure, the blind-guiding terminal 6 further includes a regulator 67. The regulator 67 is disposed on the blind-guiding terminal body, and the regulator 67 is coupled to the component to be blocked 68. The regulator 67 is configured to regulate an electrical signal to be provided to the component to be blocked to change a magnitude of the attractive force to which the component to be blocked is subjected. Optionally, the regulator 67 is coupled to an regulating switch 62 disposed on the blind-guiding terminal body. The regulating switch is, for example, a rotary knob. It is convenient for the blind person to control the regulator 67 to regulate the electrical signal to be provided to the component to be blocked 68 by rotating the rotary knob to change the magnitude of the attractive force to which the component to be blocked 68 is subjected, so as to meet requirements of different users for the magnitude of the force of the tactile reminder. Of course, in a case where the blind-guiding terminal 6 is provided with a blind-guiding terminal controller 64 therein, and the regulator 67 is coupled to the blind-guiding terminal controller 64, the regulation of the regulator 67 to the electrical signals to be provided to the component to be blocked 68 may be controlled by the blind-guiding terminal controller 64.

In some embodiments of the present disclosure, the blind-guiding terminal further includes the blind-guiding terminal controller 64. The blind-guiding terminal controller 64 is coupled to at least one of the blind-guiding terminal sensor 65, the information transmission component 63, the component to be blocked 68 or the regulator 67, and the blind-guiding terminal controller 64 may control a corresponding component coupled thereto to operate. For example, in a case where the blind-guiding terminal controller 64 is coupled to the blind-guiding terminal sensor 65, the blind-guiding terminal controller 64 controls the blind-guiding terminal sensor 65 to transmit the sensing signal when the blind person travels, and stop transmitting the sensing signal when the blind person stays for a long time, which may save electrical energy. For another example, in a case where the blind-guiding terminal controller 64 is coupled to the information transmission component 63, the blind-guiding terminal controller 64 controls a sound quality and a sound level of the information transmission component 63 when the information transmission component 63 broadcasts information to the blind person. For yet another example, in a case where the blind-guiding terminal controller 64 is coupled to the regulator 67, the blind-guiding terminal controller 64 controls the regulator 67 to regulate the electrical signal to be provided to the component to be blocked 68, which may change the magnitude of the attractive force to which the component to be blocked 68 is subjected.

In some embodiments of the disclosure, the blind-guiding terminal 6 further includes a blind-guiding terminal power supply 66 disposed on the blind-guiding terminal body. The blind-guiding terminal power supply 66 is coupled to the blind-guiding terminal sensor 65, the information transmission component 63, the component to be blocked 68 and the regulator 67. Optionally, the blind-guiding terminal power supply 66 includes a rechargeable power supply. The rechargeable power supply is coupled to a charging interface and a switch 61 disposed on the blind-guiding terminal body. The blind-guiding terminal power supply 66 may be charged by using the charging interface, and the switch 61 is used to control the blind-guiding terminal power supply 66 to output electrical energy or stop outputting the electrical energy.

In some embodiments of the present disclosure, the blind-guiding terminal body is an object which is convenient for the blind person to carry with him/her, such as a blind-guiding rod or a blind-guiding shoe.

Figure 7:
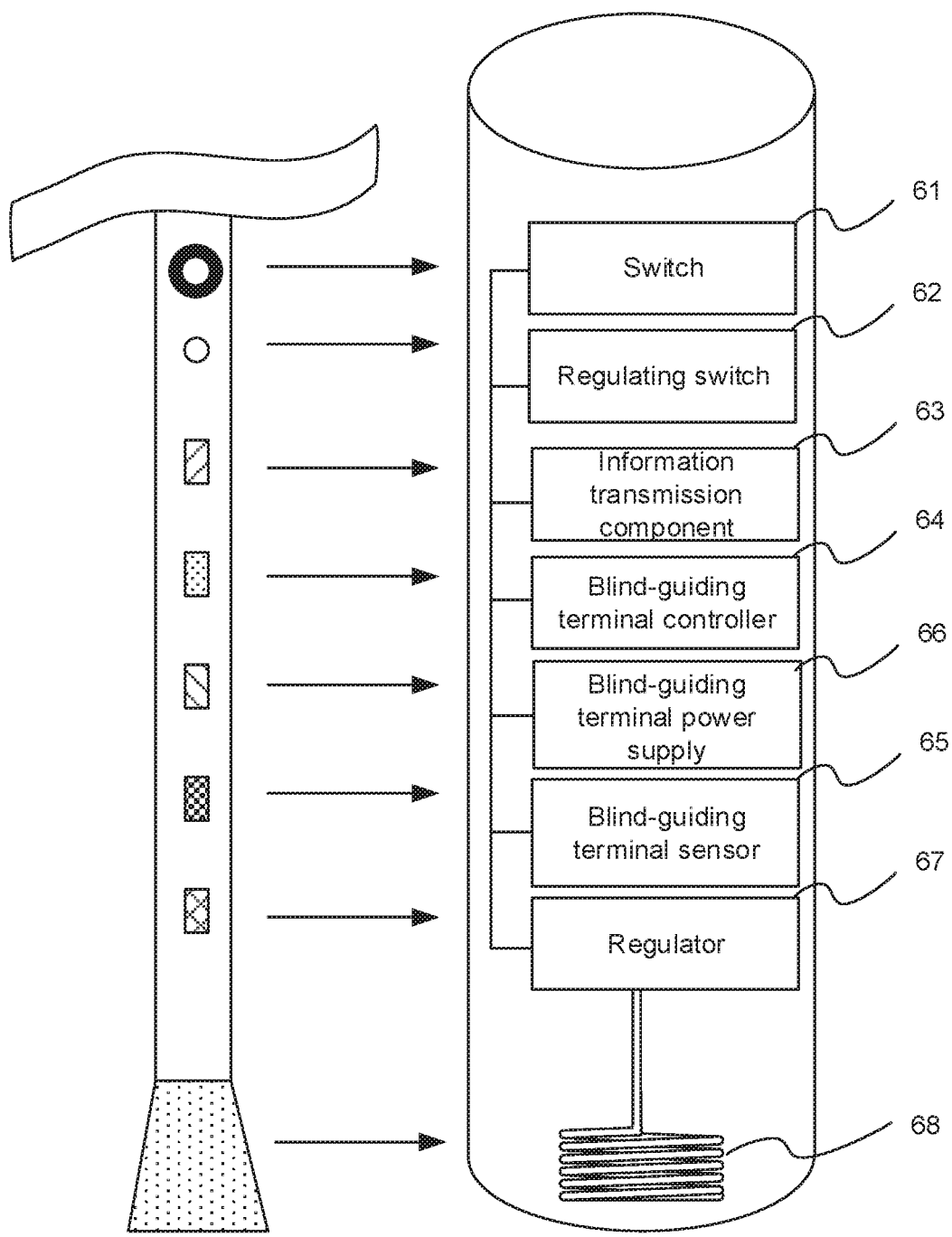
FIG. 7 is a schematic diagram showing a structure of a blind-guiding rod, according to some embodiments of the present disclosure.

For example, referring to FIG. 7, the blind-guiding terminal body includes the blind-guiding rod, and the blind-guiding rod includes a handle and a rod body. The rod body of the blind-guiding rod is provided with the blind-guiding terminal power supply 66, the information transmission component 63, the blind-guiding terminal sensor 65, the blind-guiding terminal controller 64 and the regulator 67 therein. The blind-guiding terminal power supply 66 is electrically connected to the information transmission component 63, the blind-guiding terminal sensor 65, the blind-guiding terminal controller 64 and the regulator 67. A surface of the rod body of the blind-guiding rod is provided with the charging interface electrically connected to the blind-guiding terminal power supply 66. A bottom of the rod body of the blind-guiding rod is provided with the component to be blocked 68 electrically connected to the regulator 67.

Figure 8:
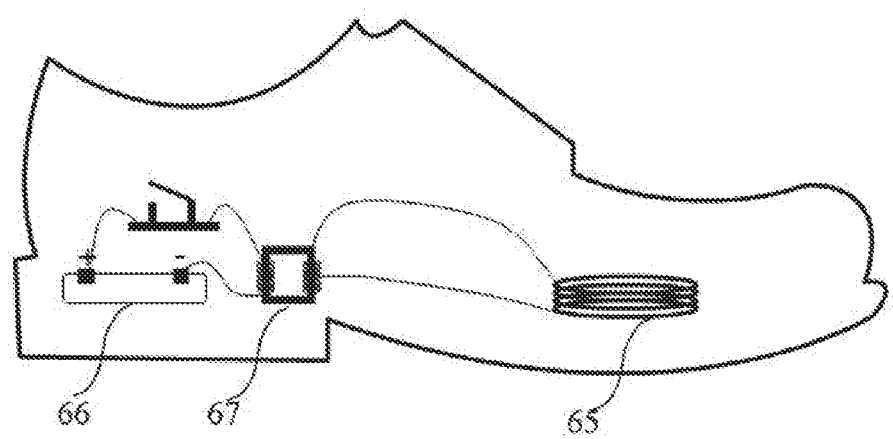
FIG. 8 is a schematic diagram showing a structure of a blind-guiding shoe, according to some embodiments of the present disclosure.

For example, referring to FIG. 8, the blind-guiding terminal body includes the blind-guiding shoe, and the blind-guiding shoe includes a sole and a vamp. The sole of the blind-guiding shoe (e.g., a heel) is provided with the blind-guiding terminal power supply 66, the information transmission component 63, the blind-guiding terminal sensor 65, the blind-guiding terminal controller 64 and the regulator 67. The blind-guiding terminal power supply 66 is electrically connected to the information transmission component 63, the blind-guiding terminal sensor 65, the blind-guiding terminal controller 64 and the regulator 67. A side surface of the sole of the blind-guiding shoe is provided with the charging interface electrically connected to the blind-guiding terminal power supply 66, The sole of the blind-guiding shoe (e.g., a forefoot) is provided with the component to be blocked 68 therein, which is electrically connected to the regulator 67. It will be noted that, the components disposed in the blind-guiding shoe are not all shown in FIG. 8, and only some of the components are shown.

Figure 9:
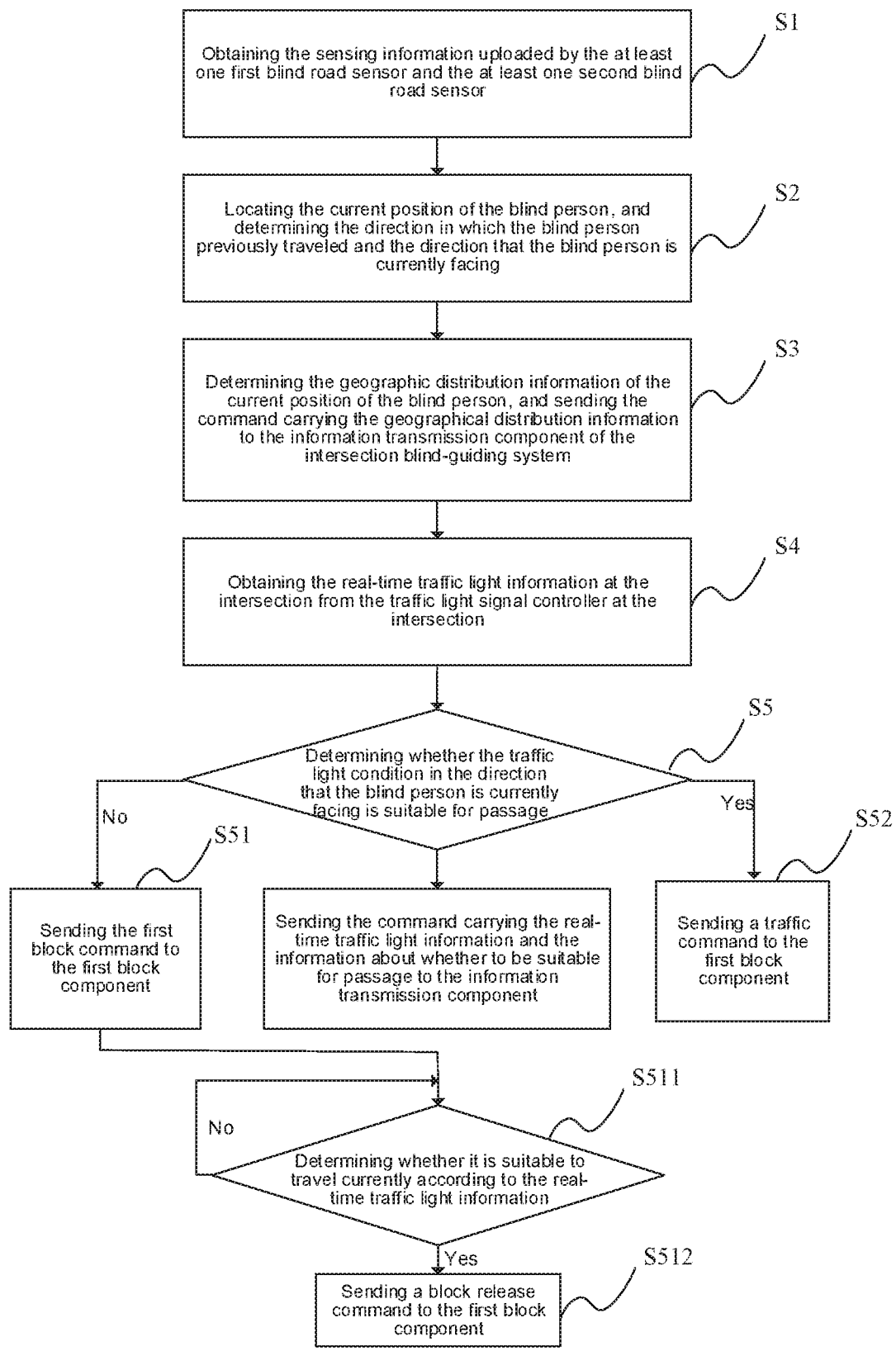
FIG. 9 is a schematic diagram showing a flow of an intersection blind-guiding method, according to some embodiments of the present disclosure.

Some embodiments of the present disclosure provide an intersection blind-guiding method applied to the intersection blind-guiding system described above. Referring to FIG. 9, the intersection blind-guiding method includes:

S1, obtaining the sensing information uploaded by the at least one first blind road sensor 11 in the traveling blind road region and the at least one second blind road sensor 21 in the blind road intersection region respectively when the blind person passes through the traveling blind road region at the end of the corner region B on a periphery of the intersection A away from the intersection; and the blind road intersection region at the end of the same corner region proximate to the intersection;

S2, locating the current position of the blind person; and determining the direction in which the blind person previously traveled and the direction that the blind person is currently facing according to the sensing information; and S3, determining the geographic distribution information of the current position of the blind person according to the direction in which the blind person previously traveled and the direction that the blind person is currently facing, and sending the command carrying the geographical distribution information to the information transmission component 63.

In some embodiments of the present disclosure, the blind person carrying the blind-guiding terminal 6 passes through the traveling blind road region at the end of a corner region B away from the intersection A, and the blind road intersection region at the end of the corner region B proximate to the intersection. The blind-guiding terminal sensor 65 of the blind-guiding terminal 6 carried by the blind person transmits the sensing signal, so that the first blind road sensor 11 and the second blind road sensor 21 respectively disposed at the two positions receive the sensing signal one after another and identify the blind-guiding terminal 6. As a result; the blind person may be distinguished from the ordinary pedestrian through the blind-guiding terminal 6. Moreover, the first blind road sensor 11 and the second blind road sensor 21 are disposed at different positions in the corner region B on a periphery of the intersection A; and the sensing information are uploaded by the first blind road sensor 11 and the second blind road sensor 21 to the processor 4, thereby achieving the field sensing of the intersection blind-guiding system to the blind person. That is, the identification range of the position information of the blind person may be narrowed down to the travel route of the blind person in the corner region B, thereby improving the identification accuracy of the position of the blind person.

Based on this, after processing and comprehensively determining the sensing information by the processor 4, the direction in which the blind person previously traveled and the direction that the blind person is currently facing may be accurately determined, and the geographical distribution information of the current position of the blind person is determined, thereby ensuring the accuracy of the field location of the blind person, and timeliness and the accuracy of the guidance information reminder, and thus providing a strong guarantee for the blind person to safely pass through the intersection.

It will be noted that, connections and signal transmission manners among components in the intersection blind-guiding system described above are selected according to actual conditions. For example, the traffic light signal controller 5 and each blind road sensor are located at the intersection A and the corner regions B around the intersection A, and a distance between the traffic signal controller 5 and each blind road sensor are very close. Therefore, wire harnesses for connection are used to transmit the signals, or a wireless connection is used to transmit the signals by means of wireless Ethernet, bluetooth, an infrared transmission, or the like. For example, the processor 4 includes a cloud server, a desktop computer, a smart mobile device or the like, and a signal transmission between the processor 4 and each component is performed, for example, by using a wireless transmission method including the wireless Ethernet, such as Wi-Fi and a 2G/3G/4G/5G mobile data network.

When the blind person is in the blind road intersection region at the end of the corner region B proximate to the intersection, the information may be transmitted to the blind person by using the information communication component 63, and/or the tactile reminder may be given to the blind person by using the first block component 22.

Referring to FIG. 9, in some embodiments of the present disclosure, the intersection blind-guiding method further includes:

S4, obtaining, by the at least one second blind road sensor 21, the real-time traffic light information at the intersection from the traffic light signal controller 5 of the intersection: and S5, determining whether the traffic light condition in the direction that the blind person is currently facing is suitable for passage according to the direction that the blind person is currently facing and the real-time traffic light information, and sending a command carrying the real-time traffic light information and the information about whether to be suitable for passage to the information transmission component 63.

Referring to FIG. 9, in some embodiments of the present disclosure, when determining whether the traffic light condition in the direction that the blind person is currently facing is suitable for passage, the intersection blind-guiding method further includes: in S52, sending a passage command to the first block component 22 of the intersection blind-guiding system corresponding to the current position of the blind person if the traffic light condition in the direction that the blind person is currently facing is determined to be suitable for passage.

Referring to FIG. 9, in some embodiments of the present disclosure, when determining whether the traffic light condition in the direction that the blind person is currently facing is suitable for passage, the intersection blind-guiding method further includes: S51, sending a first block command to the first block component 22 corresponding to the current position of the blind person if the traffic light condition in the direction that the blind person is currently facing is determined to be unsuitable for passage.

During an execution of the first block command in S51 by the first block component 22 corresponding to the current position of the blind person, referring to FIG. 9, in some embodiments of the present disclosure, the intersection blind-guiding method further includes:

S511, determining whether it is suitable to travel currently according to the real-time traffic light information in the direction that the blind person is currently facing, if so, performing S512, and if not, continuing to determine whether to be suitable for travel currently; and S512, sending a block release command to the first block component 22 corresponding to the current position of the blind person.

When the blind person is at a region at the side of the blind road intersection region proximate to the intersection A, the information may be transmitted to the blind person through the information transmission component 63, and/or the tactile reminder may be given to the blind person through the second block component 32.

Figure 10:
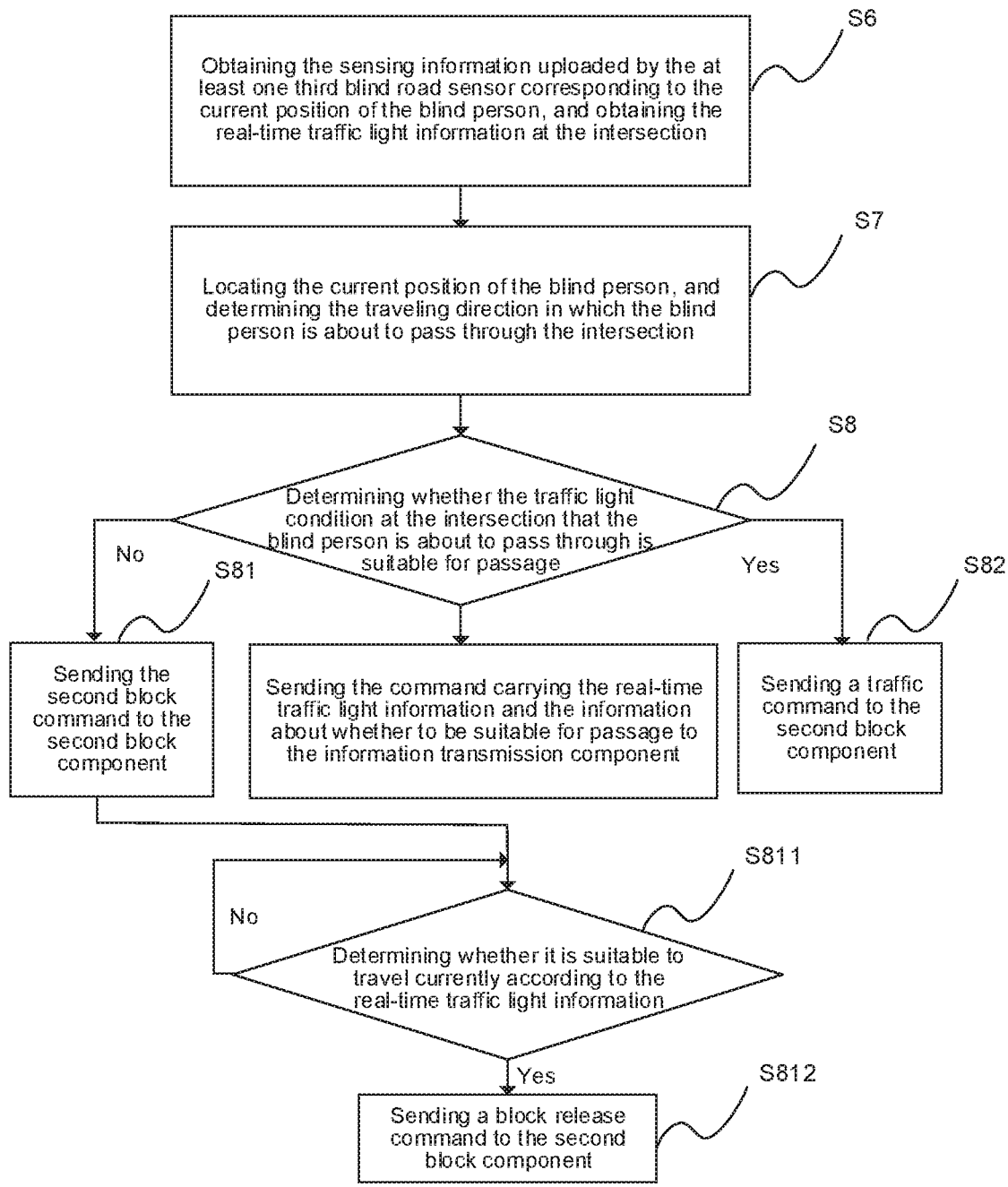
FIG. 10 is a schematic diagram showing another flow of an intersection blind-guiding method, according to some embodiments of the present disclosure.

Referring to FIG. 10, in some embodiments of the present disclosure, the intersection blind-guiding method further includes:

S6, obtaining the sensing information uploaded by the at least one third blind road sensor corresponding to the current position of the blind person, and obtaining the real-time traffic light information from the traffic light signal controller 5 of the intersection through the at least one third blind road sensor when the blind person passes through a region at the side of the blind road intersection region proximate to the intersection A;

S7, locating the current position of the blind person, and determining the traveling direction in which the blind person is about to pass through the intersection according to the sensing information; and S8, determining whether the traffic light condition at the intersection that the blind person is about to pass through is suitable for the passage according to the traveling direction and the real-time traffic light information, and sending the command carrying the real-time traffic light information and the information about whether to be suitable for the passage to the information transmission component 63.

Referring to FIG. 10, in some embodiments of the present disclosure, when determining whether the traffic light condition at the intersection that the blind person is about to pass through is suitable for the passage, the intersection blind-guiding method further includes: S82, sending a passage command to the second block component 32 corresponding to the current position of the blind person if the traffic light condition at the intersection that the blind person is about to pass through is determined to be suitable for the passage.

Referring to FIG. 10, in some embodiments of the present disclosure, when determining whether the traffic light condition at the intersection that the blind person is about to pass through is suitable for the passage, the intersection blind-guiding method further includes: S81, sending the second block command to the second block component 32 corresponding to the current position of the blind person if the traffic light condition at the intersection that the blind person is about to pass through is determined to be unsuitable for traffic.

During an execution of the second block command in S81 by the second block component 32 corresponding to the current position of the blind person, referring to FIG. 10, in some embodiments of the present disclosure, the intersection blind-guiding method further includes:

S811, determining whether it is suitable to travel currently according to the real-time traffic light information at the intersection that the blind person is about to pass through, if so; performing S812, and if not, continuing to determine whether to be suitable for travel currently; and S812, sending a block release command to the second block component 32 corresponding to the current position of the blind person.

Figure 11:
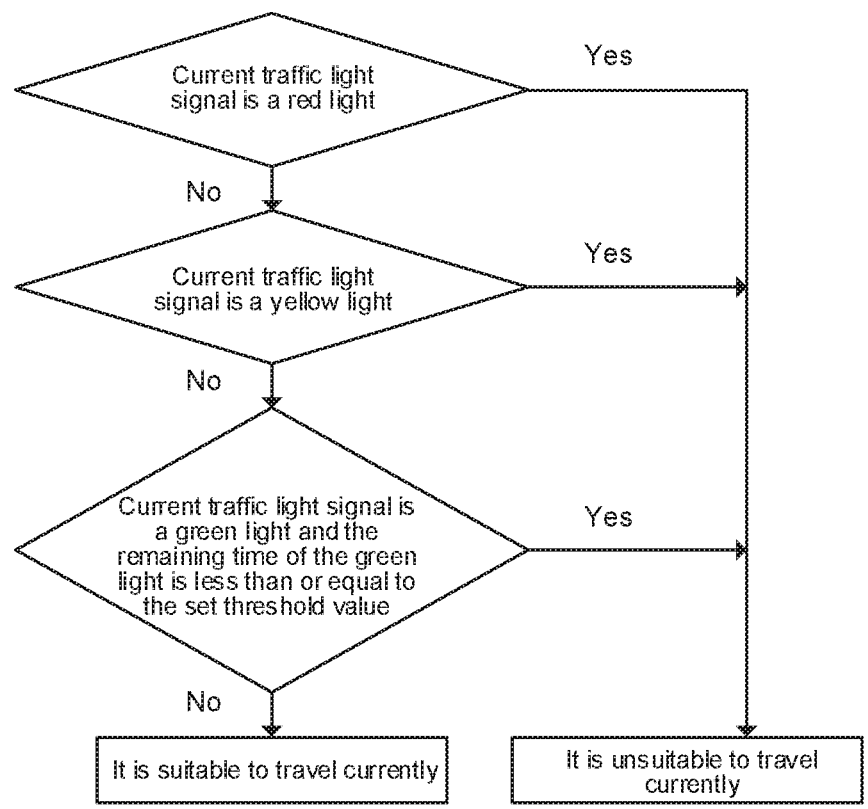
FIG. 11 is a schematic diagram showing a flow of determining whether traffic light condition is suitable for traffic in an intersection blind-guiding method, according to some embodiments of the present disclosure.

In some embodiments; S5 and S8 of determining whether the traffic light condition is suitable for the passage; includes: determining whether the traffic light is a green light currently and whether remaining time of the green light is greater than a set threshold value; if so, determining that the traffic light condition is suitable for the passage; and if not, determining that the traffic light condition is unsuitable for the passage. Referring to FIG. 11 for specific implementation processes, and it is determined whether a current traffic light condition belongs to one of the following three conditions.

In a first condition, the traffic light signal is a red light currently.

In a second condition, the traffic light signal is a yellow light currently.

In a third condition, the traffic light signal is a green light currently, and the remaining time of the green light is less than or equal to the set threshold value.

If the current traffic light condition is one of the three conditions described above; it is determined that it is unsuitable to travel currently, and if not, it is determined that it is suitable to travel currently.

It will be noted that, the threshold value refers to a preset threshold value of the remaining time of the green light, which is received by the processor 4, and a range of the threshold value is determined according to a width of the intersection A and time it takes for the blind person to safely passes through the intersection A. For example, the threshold value is 6 seconds or 8 seconds. When the remaining time of the green light is less than or equal to the set threshold value, there is a great security risk for the blind person to pass through the intersection A. When the remaining time of the green light is greater than the set threshold value, the blind person may safely pass through the intersection A.

Some embodiments of the intersection blind-guiding method will be described below in combination with actual application scenes.

Referring to FIGS. 2 and 9, the blind person carries the blind-guiding terminal 6, such as the blind-guiding rod in FIG. 7 or the blind-guiding shoe in FIG. 8, and passes through the position 101 in a corner region B, The first blind road sensor 11 at the position 101 receives a sensing signal transmitted by the blind-guiding terminal sensor 65, and uploads the sensing information to the processor 4, The processor 4 receives the sensing information and locates the position 101 that the blind person passes through. The blind person continues to move forward, and the second blind road sensor 21 at the position 20 receives the sensing signal transmitted by the blind-guiding terminal sensor 65 and uploads the sensing signal to the processor 4, The processor 4 receives the sensing information and locates the position 20 that the blind person passes through. Combining location information of the position 101 and the position 20, the processor 4 may determine that the traveling direction in which the blind person previously traveled is from the position 101 to the position 20, determine the direction that the blind person is facing when the blind person walks to the position 20, and then determines the geographic distribution information of the current position of the blind person. The blind person obtains the geographical distribution information of the current position transmitted by the information transmission component 63, and may timely and accurately identify the direction and find the correct route.

In some embodiments of the present disclosure, the blind person may further receive a voice information reminder and/or a tactile reminder of the traffic light condition when traveling to the position 20.

For example, the threshold value of the remaining time of the green light in the processor 4 is preset to be 8 seconds according to the width of the intersection A and the current road condition at the intersection A. Referring to FIGS. 9 and 11, a second blind road sensor 21 obtains the real-time traffic light information, which represents that the traffic light is a red light at this moment, at the intersection from the traffic light signal controller 5. The second blind road sensor 21 uploads the information that the traffic light is the red light to the processor 4. The processor 4 determines that it is unsuitable to travel according to the direction that the blind person is currently facing and the information that the traffic light is the red light currently, and sends a command representing that the traffic light is the red light and it is unsuitable to travel to the information transmission component 63. The information transmission component 63 broadcasts the command to the blind person, and the blind person may know that the traffic light in the direction that the blind person is currently facing is the red light, which is unsuitable for the passage. Optionally, when the processor 4 determines that it is unsuitable to travel currently, the processor 4 further sends the first block command to the first block component 22 at the position 20. The first block component 22 is energized to emit the electromagnetic field, which generates the attractive force to attract the electromagnetic coil of the component to be blocked 68 in the blind-guiding terminal 6. The blind person feels a downward attractive force through the blind-guiding terminal 6, so that the blind person knows that the traffic light condition in the direction that the blind person is currently facing is unsuitable for the passage through the tactile reminder. During an execution of the first block command by the first block component 22 at the position 20, the processor 4 continuously refreshes the real-time traffic light information received, and determines whether it is suitable to travel currently according to latest information. If it is suitable to travel, the processor 4 sends a block release command to the first block component 22. The magnetic field of the first block component 22 is reversed to generate an upward force on the component to be blocked 68, and the first block component 22 stops working immediately. The blind person who receives tactile information may move forward. If it is unsuitable to travel, the processor 4 continues to sends a first block command to the first block component 22 until it is determined that it is suitable to travel. Optionally, if the blind person does not need to pass through the traffic light in the direction that the blind person is facing, the blind person may control the regulator 67 through the regulating switch 62, thereby regulating the electrical signal to be provided to the component to be blocked 68 in the blind-guiding terminal 6 to change the magnitude of the force to which the component to be blocked 68 is subjected, thereby releasing the attractive force acting on the blind-guiding terminal 6, and facilitating the blind person to turn and continue walking.

When the traffic light in the direction that the blind person is currently facing is a yellow light, or the remaining time of the green light is less than or equal to 8 seconds, the information transmission, the determination and the working process of each component are the same as those in a case where the traffic light is the red light, and details are not described herein again. When the traffic light in the direction that the blind person is currently facing is the green light and the remaining time of the green light is greater than the set threshold value, for example, the remaining time of the green light is 25 seconds when the blind person is at the position 20, which is enough for the blind person to pass through the intersection, the processor 4 determines that it is suitable to travel currently. The processor 4 sends a passage command to the first block component 22, and the first block component 22 is in a non-working state at this moment and does not generate the magnetic field. Therefore, the blind person cannot feel the attractive force from the first block component 22 and knows that it is suitable to travel currently.

The blind person may continue straight, or turn left, or turn right after passing through the position 20. When the blind person needs to pass through the traffic light at the intersection, the blind person may further receive the broadcast reminder and/or the tactile reminder of the traffic light condition.

For example, the blind person continues to travel from the position 20 to the position 301. When the blind person passes though the position 301, a determination and a processing of the traffic light signal by the processor 4, and a process of sending the command to the second block component 32 by the processor 4 are similar to those in a case where the blind person is at the position 20. For example, When the blind person passes through the position 301, the traffic light signal is the red light, and the sensing signal and the real-time traffic light information of the intersection A received by the third blind road sensor 31 are uploaded to the processor 4. The processor 4 locates the position 301 of the blind person according to the sensing information uploaded by the third blind road sensor 31, and determines that the blind person is about to pass through the intersection through the position 301. The processor 4 sends a command representing that the traffic light is the red light and it is unsuitable to travel currently to the information transmission component 63. The information transmission component 63 broadcasts the command to the blind person, and the blind person may know that the traffic light in the direction that the blind person is currently facing is the red light, which is unsuitable for the passage. Optionally, the processor 4 determines that it is unsuitable for the blind person to travel, and sends a second block command to the second block component 32. After receiving the second block command, the second block component 32 is energized to generate the magnetic field to generate an electromagnetic attractive force to attract the electromagnetic coil of the component to be blocked 68 in the blind-guiding terminal 6, so that the blind person knows that it is unsuitable to travel through the tactile reminder. During the execution of the second block command by the second block component 32, the processor 4 continuously refreshes the real-time traffic light information received, and determines whether it is suitable to travel currently. If it is suitable to travel, the processor 4 sends a block release command to the second block component 32. The magnetic field of the second block component 32 is reversed to generate an upward force on the component to be blocked 68, and the second block component 32 stops working immediately. The blind person who receives the tactile information may move forward. If it is unsuitable to travel, the processor 4 continues to send the second block command to the second block component 32 until it is determined that it is suitable to travel. When the blind person is at the position 301 and the traffic light is the yellow light or the green light, a determination and a processing of information, and an execution process of each component are similar to those in a case where the blind person is at the position 20, and details are not described herein again.

In several embodiments provided by the present disclosure, it will be understood that, processes for implementing respective functions in respective embodiments may be integrated to form an independent process, or each process may exist independently, or two or more processes are integrated to form an independent process.

Since some embodiments of the intersection blind-guiding method are substantially similar to some embodiments of the intersection blind-guiding system, some embodiments of the intersection blind-guiding method are simply described. All relevant aspects of the steps involved in some embodiments of the intersection blind-guiding method may be referred to descriptions about functions of corresponding components of the intersection blind-guiding system, and details are not described herein again.

Some embodiments of the present disclosure provide a blind-guiding terminal 6. The blind-guiding terminal 6 includes the blind-guiding terminal body, the information transmission component 63 and the blind-guiding terminal sensor 65 disposed on the blind-guiding terminal body. The blind-guiding terminal sensor 65 is configured to transmit the sensing signal. The information transmission component 63 is configured to transmit at least one of the geographic distribution information corresponding to the current position of the blind person, the traffic light condition at the intersection, or the information about whether the intersection A is suitable for passage.

As for a structure, a working process and beneficial effects of the above blind-guiding terminal 6, reference may be made to descriptions in the intersection blind-guiding system and the intersection blind-guiding method described above, and details are not described herein again.

Some embodiments of the present disclosure provide a computer product including one or more processors configured to execute computer instructions to perform one or more steps in the intersection blind-guiding method described above.

Some embodiments of the present disclosure provide a computer non-transitory readable storage medium. The computer non-transitory readable storage medium stores computer instructions configured to perform the intersection blind-guiding method described above.

Some embodiments of the present disclosure provide a computer program that, when loaded into a processor, causes the processor to perform the intersection blind-guiding method described above.

Some embodiments of the present disclosure may be implemented in whole or in part by software, hardware, firmware, or any combination thereof. When some embodiments of the present disclosure are implemented by using a software program, a form of a computer program product may appear in whole or in part. The computer program product includes one or more computer instructions. When the computer program instructions are loaded and executed on a computer, the processes or functions according to some embodiments of the present disclosure are generated in whole or in part. The computer may be a general purpose computer, a special purpose computer, a computer network, or one of any other programmable devices. The computer instructions may be stored in a computer readable storage medium, or transferred from one computer readable storage medium to another computer readable storage medium, for example, the computer instructions may be transferred from a website site, computer, server or data center to another website site, computer, server, or data center by means of wire (e.g., a coaxial cable, a fiber optic, a digital subscriber line (DSL)), or wireless (e.g., infrared, wireless, microwave, etc.). The computer readable storage medium may be any available media that may be accessed by a computer, or a data storage device such as a server or a data center integrating by one or more available media. The available medium may be a magnetic medium (e.g., a floppy disk, a hard disk, a magnetic tape), an optical medium (e.g., a DVD), or a semiconductor medium (e.g., a solid state disk (SSD)) or the like.

Beneficial effects that may be achieved by the computer product provided by some embodiments of the present disclosure are the same as the beneficial effects that may be achieved by the intersection blind-guiding method in some embodiments of the present disclosure, and details are not described herein again.

The foregoing descriptions are merely specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. An intersection blind-guiding system, comprising:
   a blind-guiding terminal, wherein the blind-guiding terminal includes a blind-guiding terminal sensor, and the blind-guiding terminal sensor is configured to transmit a sensing signal;
   a plurality of blind road sensors configured to be disposed in a corner region on a periphery of an intersection, wherein the plurality of blind road sensors include at least one first blind road sensor and at least one second blind road sensor; each first blind road sensor is configured to be disposed in a traveling blind road region at an end of the corner region away from the intersection; each second blind road sensor is configured to be disposed in a blind road intersection region at an end of the corner region proximate to the intersection; and the plurality of blind road sensors are configured to separately receive the sensing signal transmitted by the blind-guiding terminal sensor, and upload corresponding sensing information; and
   a processor configured to be coupled to the plurality of blind road sensors, wherein the processor is configured to receive the sensing information uploaded by the plurality of blind road sensors, locate a current position of a blind person carrying the blind-guiding terminal, determine a direction in which the blind person previously traveled, determine geographic distribution information of the current position of the blind person, and send a command carrying the geographical distribution information;
   wherein the blind-guiding terminal further includes an information transmission component configured to be coupled to the processor; and the information transmission component is configured to receive the command carrying the geographical distribution information and transmit the geographic distribution information of the current position of the blind person.

2. The intersection blind-guiding system according to claim 1, wherein each second blind road sensor is further configured to be coupled to a traffic light signal controller at the intersection; and each second blind road sensor is further configured to obtain real-time traffic light information at the intersection from the traffic light signal controller in response to receiving the sensing signal, and upload the real-time traffic light information to the processor;

the processor is further configured to determine whether traffic light condition in a direction that the blind person is currently facing is suitable for passage according to the direction that the blind person is currently facing and the real-time traffic light information, and send a command carrying the real-time traffic light information and information about whether to be suitable for passage; and the information transmission component is further configured to receive the command carrying the real-time traffic light information and the information about whether to be suitable for passage, and transmit the real-time traffic light information in the direction that the blind person is currently facing and the information about whether to be suitable for passage.

3. The intersection blind-guiding system according to claim 2, further comprising:

at least one first block component configured to be disposed in the corner region on the periphery of the intersection; wherein each first block component is configured to be disposed in a blind road intersection region at an end of the corner region proximate to the intersection;

the processor is further configured to be coupled to the at least one first block component, wherein the processor is further configured to send a first block command to a first block component corresponding to the current position of the blind person in a case of determining that the traffic light condition in the direction that the blind person is currently facing is unsuitable for passage, and each first block component is configured to receive the first block command and generate an attractive force; and the blind-guiding terminal further includes a component to be blocked, and the component to be blocked is configured to be attracted by the attractive force.

4. The intersection blind-guiding system according to claim 3, wherein the plurality of blind road sensors further include at least one third blind road sensor configured to be disposed at a side of the blind road intersection region proximate to the intersection;

each third blind road sensor is configured to be coupled to the traffic light signal controller; and each third blind road sensor is configured to receive the sensing signal transmitted by the blind-guiding terminal sensor and obtain real-time traffic light information at the intersection from the traffic light signal controller, and upload corresponding sensing information and the real-time traffic light information to the processor;

the processor is further configured to receive the sensing information and the real-time traffic light information uploaded by the third blind road sensor, locate a position of the blind person when the blind person passes through the third blind road sensor according to the sensing information, determine a traveling direction in which the blind person is about to pass through the intersection, determine whether traffic light condition at the intersection that the blind person is about to pass through is suitable for passage according to the traveling direction and the real-time traffic light information, and send a command carrying the real-time traffic light information and information about whether to be suitable for passage; and the information transmission component is further configured to receive the command carrying the real-time traffic light information and the information about whether to be suitable for passage, and transmit the real-time traffic light information at the intersection that the blind person is about to pass through and the information about whether to be suitable for passage.

5. The intersection blind-guiding system according to claim 4, further comprising:

at least one second block component configured to be disposed in the corner region on the periphery of the intersection; wherein each second block component is configured to be disposed at a side of a blind road intersection region proximate to the intersection of the corner region; and the processor is further configured to be coupled to the at least one second block component, wherein the processor is further configured to send a second block command to a second block component corresponding to the current position of the blind person in a case of determining that the traffic light condition at the intersection that the blind person is about to pass through is unsuitable for passage, and the second block component is configured to receive the second block command and generate an attractive force;

the component to be blocked is further configured to be attracted by the attractive force generated by the second block component.

6. The intersection blind-guiding system according to claim 5, wherein each first block component and each second block component includes a magnetic field transmitter, and the component to be blocked includes an electromagnetic coil, wherein the electromagnetic coil is configured to be attracted by the magnetic field transmitter in a case where the magnetic field transmitter generates a magnetic field.

7. The intersection blind-guiding system according to claim 5, wherein the at least one first blind road sensor, the at least one second blind road sensor, and the at least one first block component are respectively disposed in reserved spaces below blind bricks in corresponding blind road regions including the traveling blind road region and the blind road intersection region, or disposed inside the blind bricks in the corresponding blind road regions; and the at least one third blind road sensor and the at least one second block component are respectively disposed in reserved spaces below blind bricks in corresponding setting regions at a side of the blind road intersection region proximate to the intersection, or disposed inside the blind bricks in the corresponding setting regions, or disposed in reserved space below roads in the corresponding setting regions.

8. The intersection blind-guiding system according to claim 5, wherein the plurality of blind road sensors, the at least one first block component, and the at least one second block component are coupled to a power supply of a traffic light at the intersection.

9. The intersection blind-guiding system according to claim 3, wherein the blind-guiding terminal further includes a blind-guiding terminal body, wherein the blind-guiding terminal sensor, the information transmission component, and the component to be blocked are disposed on the blind-guiding terminal body; or the blind-guiding terminal sensor and the component to be blocked are disposed on the blind-guiding terminal body.

10. The intersection blind-guiding system according to claim 9, wherein the blind-guiding terminal further includes a regulator, a blind-guiding terminal controller, and a blind-guiding terminal power supply that are disposed on the blind-guiding terminal body; and
   the regulator is coupled to the component to be blocked, and the regulator is configured to regulate an electrical signal to be provided to the component to be blocked to change a magnitude of the attractive force to which the component to be blocked is subjected;
   the blind-guiding terminal controller is coupled to at least one of the blind-guiding terminal sensor, the information transmission component, the component to be blocked or the regulator; and
   the blind-guiding terminal power supply is coupled to the blind-guiding terminal sensor, the information transmission component, the component to be blocked, the regulator, and the blind-guiding terminal controller.

11. The intersection blind-guiding system according to claim 1, wherein the blind-guiding terminal sensor includes an integrated circuit chip, and each blind road sensor includes an integrated circuit reader; or
   the blind-guiding terminal sensor includes a radio frequency identification chip, and each blind road sensor includes a radio frequency identification reader; or
   the blind-guiding terminal sensor includes an electromagnetic coil, and each blind road sensor includes an electromagnetic sensor.

12. An intersection blind-guiding method, comprising:
   obtaining sensing information uploaded by at least one first blind road sensor in a traveling blind road region and at least one second blind road sensor in a blind road intersection region respectively in cases where a blind person carrying a blind-guiding terminal passes through the traveling blind road region at an end of a corner region on a periphery of an intersection away from the intersection, and the blind road intersection region at an end of the corner region proximate to the intersection;
   locating a current position of the blind person, and determining a direction in which the blind person previously traveled-according to the sensing information;
   determining geographic distribution information of the current position of the blind person according to the direction in which the blind person previously traveled, and sending a command carrying the geographical distribution information to an information transmission component;
   obtaining real-time traffic light information at the intersection; and
   determining whether traffic light condition in a direction that the blind person is currently facing is suitable for passage according to the direction that the blind person is currently facing and the real-time traffic light information, and sending a command carrying the real-time traffic light information and information about whether to be suitable for passage to the information transmission component.

13. The intersection blind-guiding method according to claim 12, further comprising:
   sending a first block command to a first block component corresponding to the current position of the blind person in a case of determining that the traffic light condition in the direction that the blind person is currently facing is unsuitable for passage;
   sending a passage command to the first block component corresponding to the current position of the blind person in a case of determining that the traffic light condition in the direction that the blind person is currently facing is suitable for passage; and
   during an execution of the first block command by the first block component corresponding to the current position of the blind person, determining whether to be suitable for passage currently according to real-time traffic light information in the direction that the blind person is currently facing, and if so, sending a block release command to the first block component corresponding to the current position of the blind person.

14. The intersection blind-guiding method according to claim 13, further comprising:
   obtaining sensing information uploaded by at least one third blind road sensor corresponding to the current position of the blind person, and obtaining the real-time traffic light information from a traffic light signal controller at the intersection through the at least one third blind road sensor when the blind person passes through a region at a side of the blind road intersection region proximate to the intersection;
   locating the current position of the blind person, and determining a traveling direction in which the blind person is about to pass through the intersection according to the sensing information; and
   determining whether traffic light condition at the intersection that the blind person is about to pass through is suitable for passage according to the traveling direction and the real-time traffic light information, and sending a command carrying the real-time traffic light information and information about whether to be suitable for passage.

15. The intersection blind-guiding method according to claim 12, wherein determining whether the traffic light condition is suitable for passage, includes: determining whether a traffic light is a green light currently and whether remaining time of the green light is greater than a set threshold value, if so, determining that the traffic light condition is suitable for passage, and if not, determining that the traffic light condition is unsuitable for passage.

16. The intersection blind-guiding method according to claim 14, further comprising:
   sending a second block command to a second block component corresponding to the current position of the blind person in a case of determining that the traffic light condition at the intersection that the blind person is about to pass through is unsuitable for passage;
   sending a passage command to the second block component corresponding to the current position of the blind person in a case of determining that the traffic light condition at the intersection that the blind person is about to pass through is suitable for passage; and
   during an execution of the second block command by the second block component corresponding to the current position of the blind person, determining whether to be suitable for passage currently according to the real-time traffic light information at the intersection that the blind person is about to pass through, and if so, sending a block release command to the second block component corresponding to the current position of the blind person.

17. A blind-guiding terminal, comprising:
a blind-guiding terminal body;
a blind-guiding terminal sensor disposed on the blind-guiding terminal body, wherein the blind-guiding terminal sensor is configured to transmit a sensing signal;
an information transmission component disposed on the blind-guiding terminal body, wherein the information transmission component is configured to transmit at least one of geographic distribution information corresponding to a current position of a blind person carrying the blind-guiding terminal, real-time traffic light information at an intersection, or information about whether to be suitable for passage; and
a component to be blocked disposed on the blind-guiding terminal body.

18. A computer product, comprising one or more processors, wherein the one or more processors are configured to execute computer instructions to perform one or more steps of the intersection blind-guiding method according to claim 12.

* * * * *